United States Patent [19]

Kuwashima et al.

[11] Patent Number: 4,935,337
[45] Date of Patent: Jun. 19, 1990

[54] SILVER HALIDE PHOTOGRAPHIC MATERIAL

[75] Inventors: Shigeru Kuwashima; Yoshihiro Jimbo; Keiichi Adachi, all of Minami-ashigara, Japan

[73] Assignee: Fuji Photo Film Co., Ltd., Kanagawa, Japan

[21] Appl. No.: 260,051

[22] Filed: Oct. 20, 1988

[30] Foreign Application Priority Data

Oct. 20, 1987 [JP] Japan .................................. 62-264396
Nov. 20, 1987 [JP] Japan .................................. 62-294678

[51] Int. Cl.$^5$ ........................ G03C 1/12; G03C 1/485
[52] U.S. Cl. .................................... 430/522; 430/582; 430/583; 430/584; 430/585; 430/518; 430/539; 430/567; 430/596; 430/587; 430/600
[58] Field of Search ............... 430/583, 582, 584, 585, 430/587, 589, 567, 600, 596, 518, 539, 522

[56] References Cited

U.S. PATENT DOCUMENTS 4,078,933  3/1978  Sugiyama et al. .................. 430/518
4,102,688  7/1978  Sugiyama et al. .................. 430/587
4,564,591  1/1986  Tanaka et al. ...................... 430/603

FOREIGN PATENT DOCUMENTS 0226541  7/1981  European Pat. Off. .
2400055  3/1979  France .
1278621  3/1979  United Kingdom .
2156373  4/1980  United Kingdom .
1579899  11/1980 United Kingdom .
1521083  7/1982  United Kingdom .
1512863  6/1983  United Kingdom .

Primary Examiner—Paul R. Michl
Assistant Examiner—Thorl Chea
Attorney, Agent, or Firm—Birch, Stewart, Kolasch & Birch

[57] ABSTRACT

There is provided a silver halide photographic material wherein a hydrophilic colloid layer is dyed with a new water-soluble dye that will not adversely affect the photographic characteristics of the silver halide emulsion layer. The silver halide photographic material exhibits excellent performance in that the dye is photochemically inactive such that not allow the sensitivity to lower, the latent image to fade, or the image to fog, and the decoloring or dissolving of the dye proceed rapidly in a photographic processing step, leaving no detrimental color on the processed photographic material.

12 Claims, No Drawings ically to a silver halide photographic material having a hydrophilic colloid layer that is colored with a dye which is photochemically inactive and will be decolored and/or will dissolve out easily in a photographic processing step.

SILVER HALIDE PHOTOGRAPHIC MATERIAL

BACKGROUND OF THE INVENTION

(1) Field of the Invention

The present invention relates to a silver halide photographic material containing a dye, and more particularly to a silver halide photographic material having a hydrophilic colloid layer that is colored with a dye which is photochemically inactive and will be decolored and/or will dissolve out easily in a photographic processing step.

(2) Description of the Prior Art

In silver halide photographic materials, for the purpose of absorbing light having a specific wavelength range, a photographic emulsion layer or other layer is often colored.

When it is required to control the spectral composition of the incident light over the photographic emulsion layer, a colored layer is provided farther away from the base than the photographic emulsion layer on the photographic material. Such a colored layer is called a filter layer. When plural photographic emulsion layers are present as a multi-color photographic material, sometimes filter layers are situated between them.

To prevent blurring of an image, that is, halation caused when light scattered during or after its passage through the photographic emulsion layer is reflected by the interface between the emulsion layer and the base, or by the surface of the photographic material opposite the emulsion layer, thereby again falling into the photographic emulsion layer, a colored layer is provided between the photographic emulsion layer and the base, or on the surface of the base opposite the photographic emulsion layer. Such a colored layer is called an antihalation layer. For multi-color photographic material, sometimes an antihalation layer is provided between the layers.

To prevent the sharpness of an image from lowering due to the scattering of light in a photographic emulsion layer (such lowering is generally called irradiation), in some cases the photographic layer is colored.

These layers to be colored, in many cases, consist of hydrophilic colloid, and therefore in order to color them water-soluble dyes are generally incorporated into the layers. Such dyes are required to meet the following conditions:

(1) The dye has suitable spectral absorption in compliance with the purpose of the application.

(2) The dye is photochemically inactive. That is, the dye does not adversely affect chemically the performance of the silver halide photographic emulsion layer, and, for example, it does not allow the sensitivity to lower, the latent image to fade, or the image to fog.

(3) The dye is decolored or dissolved and eliminated in a photographic processing step, leaving no detrimental color on the processed photographic material.

Those skilled in the art have made many efforts to find dyes meeting these conditions, and the following dyes are known: oxonol dyes having a pyrazolone nucleus or a barbituric acid nucleus described, for example, in British Pat. Nos. 506,385, 1,177,429, 1,311,884, 1,338,799, 1,385,371, 1,467,214, 1,433,102, and 1,553,516, JP-A ("JP-A" means unexamined Japanese patent application) Nos. 85130/1973, 114420/1974, 161233/1980, and 111640/1984, and U.S. Pat. Nos. 3,247,127, 3,469,985, and 4,078,933, and oxonol dyes having a hydroxypyridone described, for example, in British Pat. Nos. 1,278,621, 1,512,863, 1,521,083, and 1,579,899.

It is not rare that hydroxypyridone oxonol dyes hitherto known have adverse effects in a photographic emulsion (for example lowering of the sensitivity, considered due to desorption of a sensitizing dye caused by them or their spectral sensitization). Some hydroxypyridone oxonol dyes leave a detrimental color on the processed photographic image depending on the type of rapid development processing that has been performed recently. To solve this, although it is suggested to use a dye highly reactive with sulfite ions or hydroxy ions, this has the defect that the stability in the photographic film is inadequate and the concentration lowers with time, thus not delivering the desired photographic effect. Further, in many cases the layer to be colored is composed of a hydrophilic colloid, and therefore the dye with which the layer is colored must be soluble in water.

The silver halide photographic material suggested by the present invention contains a new water-soluble dye in a photographic emulsion layer or other layer.

BRIEF SUMMARY OF THE INVENTION

An object of the present invention is to provide a silver halide photographic material wherein a hydrophilic colloid layer is dyed with a new water-soluble dye that will not adversely affect the photographic characteristics of the silver halide emulsion layer.

Another object of the present invention is to provide a silver halide photographic material wherein a hydrophilic colloid layer is dyed with a new water-soluble dye excellent in decolorability.

Still another object of the present invention is to provide a silver halide photographic material wherein a dyed hydrophilic colloid layer contains a new water-soluble dye that is stable over time.

Other and further objects, features, and advantages of the invention will appear more fully from the following description.

DETAILED DESCRIPTION OF THE INVENTION

These objects of the present invention are fulfilled by providing (1) a silver halide photographic material characterized in that the silver halide photographic material contains at least one of dyes represented by the following formula (I):

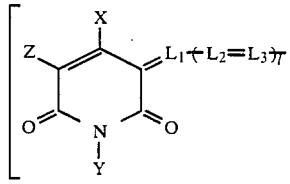

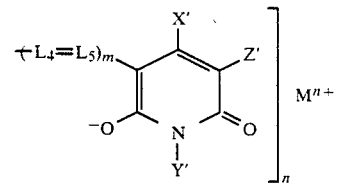

wherein X and X' each represent a hydrogen atom, a hydroxy group, a carboxyl group, —COOR$_1$, —COR$_1$, —CONH$_2$, —CONR$_1$R$_2$, an alkyl group, an aralkyl group, a cycloalkyl group, an aryl group, or an amino group; Y and Y' each represent a hydrogen atom, an alkyl group, an aralkyl group, a cycloalkyl group, an aryl group, or an amino group; Z and Z' each represent a hydrogen atom, a cyano group, a carboxyl group, a sulfo group, an amino group,

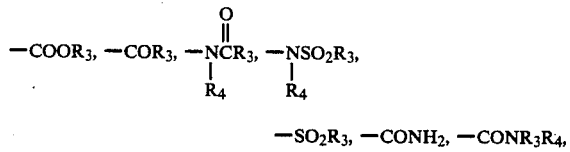

an alkyl group, an aralkyl group, a cycloalkyl group, or an aryl group; R$_1$ and R$_3$ each represent an alkyl group, an aralkyl group, a cycloalkyl group, or an aryl group; R$_2$ and R$_4$ each represent a hydrogen atom, an alkyl group, an aralkyl group, a cycloalkyl group, or an aryl group; L$_1$, L$_2$, L$_3$, L$_4$, and L$_5$ each represent a methine group; l and m each are 0 or 1; n is 1, 2, or 3; and M$^{n+}$ represents an n-valent cation, provided that at least one of X, X', Y, Y', Z, and Z' represents a group including a hydroxy group, a carboxyl group, or a sulfo group.

(2) The silver halide photographic material described above (1), characterized in that the silver halide grains consist of silver chlorobromide containing 90 mol % or over of silver chloride.

(3) The silver halide photographic material described above (1), characterized in that said silver halide photographic material is a positive-positive type silver halide color photographic material.

(4) The positive-positive type silver halide color photographic material described above (3), characterized in that:

(i) the wavelength exhibiting the maximum sensitivity of the spectral sensitivity of the red-sensitive emulsion layer is on the side where the wavelength is longer than 580 nm, and of the wavelengths corresponding a the sensitivity of 30% of the maximum sensitivity of its spectral sensitivity, the wavelength on the shortest wavelength side is on the side where the wavelength is longer than 560 nm, and (ii) the wavelength exhibiting the maximum sensitivity of the spectral sensitivity of the green-sensitive emulsion layer is on the side where the wavelength is shorter than 580 nm, and of the wavelengths corresponding to the sensitivity of 30% of the maximum sensitivity of its spectral sensitivity, the wavelength on the longest wavelength side is on the side where the wavelength is shorter than 590 nm.

Particularly, the dyes used in the present invention can be represented by the following formula:

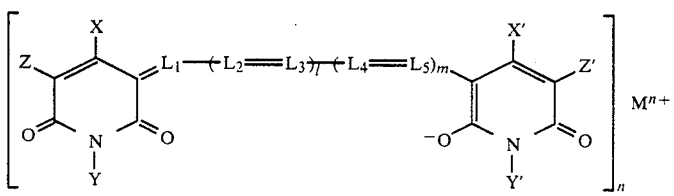

wherein X and X' each represent a hydrogen atom, a hydroxy group, a carboxyl group, —COOR$_1$, —COR$_1$, —CONH$_2$, —CONR$_1$R$_2$, an alkyl group (preferably one having 1-6 carbon atoms, e.g., methyl, ethyl, normal propyl, isopropyl, sulfomethyl, carboxymethyl, hydroxymethyl, and 2-ethoxyethyl), an aralkyl group (preferably one having 7-20 carbon atoms, e.g., benzyl, 4-sulfobenzyl, and 3-carboxybenzyl), a cycloalkyl group (preferably one having 3-11 carbon atoms, e.g., cyclohexyl), an aryl group (preferably one having 6-12 carbon atoms, e.g., phenyl, 4-methoxyphenyl, 3-sulfophenyl, 4-sulfophenyl, and 4-sulfobutyloxyphenyl), or an amino group (e.g., —HN, dimethyl amino, carboxymethylamino, and 2-sulfoethylamino); Y and Y' each represent a hydrogen atom, an alkyl group (preferably one having 1-6 carbon atoms, e.g., ethyl, isopropyl, normal butyl, 2-hydroxyethyl, carboxymethyl, 2-carboxyethyl, and sulfoethyl), an aralkyl group (preferably one having 7-20 carbon atoms, e.g., benzyl, 4-sulfobenzyl, and 2-(4-sulfophenyl)ethyl), a cycloalkyl group (preferably one having 3-11 carbon atoms, e.g., cyclopentyl and cyclohexyl), an aryl group (preferably one having 6-20 carbon atoms, e.g., phenyl, 4-methoxyphenyl, 4-hydroxyphenyl, 3-carboxyphenyl, 3-sulfophenyl, and 4-sulfophenyl), or an amino group (e.g., —NH, 3-carboxyphenylamino, 2-sulfophenylamino, and dimethylamino); Z and Z' each represent a hydrogen atom, a cyano group, a carboxyl group, a sulfo group, an amino group,

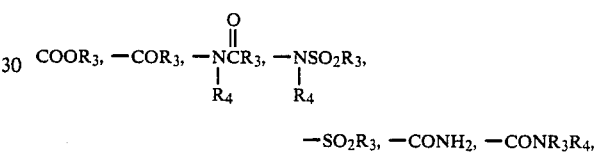

an alkyl group (preferably one having 1-6 carbon atoms e.g., methyl, ethyl, hydroxylmethyl, 2-hydroxylethyl, sulfobutyloxymethyl, and sulfomethyl), an aralkyl group (preferably one having 7-20 carbon atoms, e.g., benzyl, 1-sulfoethyl, and 4-sulfobenzyl), a cycloalkyl group (preferably one having 3-11 carbon atoms, e.g., cyclohexyl), or an aryl group (preferably one having 6-20 carbon atoms, e.g., phenyl and 3-sulfophenyl); R$_1$ and R$_3$ each represent an alkyl group (preferably one having 1-6 carbon atoms, e.g., ethyl, carboxymethyl, 2-hydroxyethyl, 2-(2-hydroxyethoxy)ethyl, and 2-sulfoethyl), an aralkyl group (preferably one having 7-20 carbon atoms, e.g., benzyl, 4-sulfobenzyl, and 2-(4-sulfophenyl)ethyl), a cycloalkyl group (preferably one having 3-11 carbon atoms, e.g., cyclohexyl), or an aryl group (preferably one having 6-20 carbon atoms, e.g., phenyl, 4-hydroxylphenyl, 3-carboxylphenyl, and 4-sulfophenyl); R$_2$ and R$_4$ each represent a hydrogen atom, an alkyl group (preferably one having 1-6 carbon atoms, e.g., methyl, ethyl, 2-hydroxyethyl, and 4-sulfobutyl), an aralkyl group (preferably one having 7-20 carbon atoms, e.g., benzyl and 4-sulfobenzyl), a cycloal-kyl group (preferably one having 3-11 carbon atoms, e.g., cyclohexyl), or an aryl group (preferably one having 6–20 carbon atoms, e.g., phenyl, 4-hydroxyphenyl, 3-carboxyphenyl, and 4-sulfophenyl); $L_1$, $L_2$, $L_3$, $L_4$, and $L_5$ each represent a methine group (e.g., unsubstituted methyl, ethyl, or phenyl or substituted methine); l and m each are 0 or 1; n is 1, 2 or 3; and $M^{n+}$ represents an n-valent cation (e.g., $H^+$, $Li^+$, $Na^+$, $K^+$, $Mg^{2+}$, $Ca^{2+}$, $Ba^{2+}$, $NH_4^+$, triethylammonium, and pyridinium), provided that at least one of X, X', Y, Y', Z, and Z' represents a group including a hydroxy group, a carboxyl group, or a sulfo group (e.g., carboxyphenyl, sulfophenyl, sulfoethyl, hydroxymethyl, carboxymethyl, and 4-sulfobenzyl).

Herein, the carboxyl group and the sulfo group not only include free acids, they also may form salts (for example with $Na^+$, $K^+$, $Li^+$, $NH_4^+$, triethylammonium or pyridinium).

The compounds represented by formula (I) can be synthesized by various processes, for example by reacting a hydroxypyridone (II) with a compound represented by (III-a), (III-b) or (III-c), in a suitable solvent under acidic or basic conditions.

In the above formulae, X, Y, Z, $L_1$, $L_2$, $L_3$, $L_4$, $L_5$, l, m, n, and $M^{n+}$ have the same meaning as stated above, E represents a hydrogen atom, a nitro group, or a halogen atom (e.g., chlorine, and bromine), $Hal^-$ represents an anion (e.g., $Cl^-$, $Br^-$, $I^-$, methylsulfate, and p-toluenesulfonate), R represents an alkyl group having 1 or 2 carbon atoms (e.g., methyl and ethyl), and R' represents an alkyl group having 1 or 2 carbon atoms (e.g., methyl, and ethyl), or a phenyl group.

Hydroxypyridones represented by formula (II) used for synthesizing compounds represented by formula (I) in the present invention can be synthesized, for example, in accordance with processes described by Klinsberg in *Heterocyclic compounds-pyridine and derivatives*, section 3, published by Inter Press, 1962, JP-B ("JP-B" means examined Japanese patent publication) No. 52827/1976, West German Patent Application (OLS) Nos. 2,162,612, 2,349,709, and 2,902,486, U.S. Pat. No. 3,763,170, *Journal of the American Chemical Society*, 1943, Vol. 65, page 449, *Journal of Chemical Technology and Biotechnology*, 1986, Vol. 36, page 410, and *Tetrahedron*, 1966, Vol. 22, page 445. Specific examples of

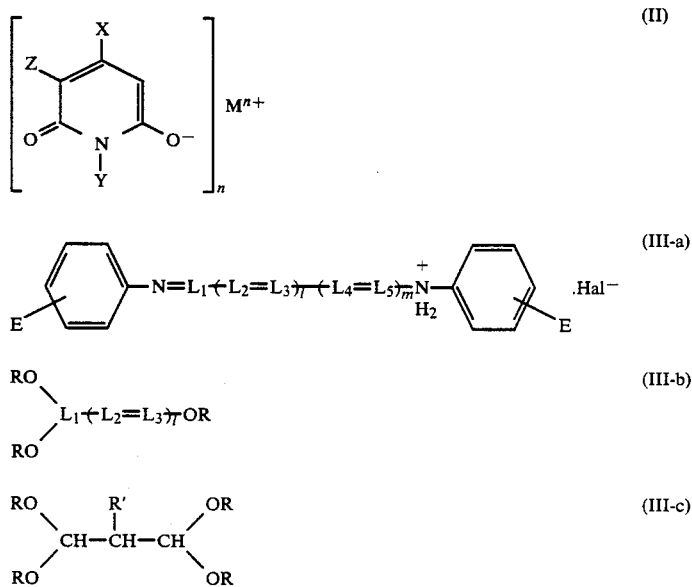

Suitable solvents include methanol, ethanol, isopropyl alcohol, acetic acid, N,N-dimethylformamide, and pyridine.

compounds according to the present invention are given below, but the present invention is not limited to them.

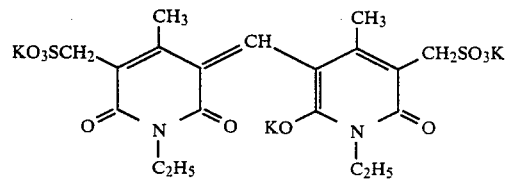

1.

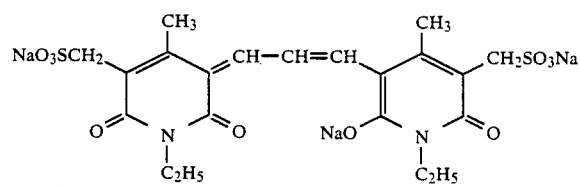

2.

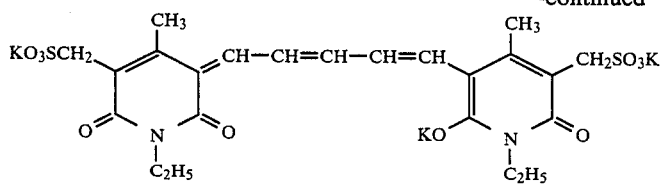
3.
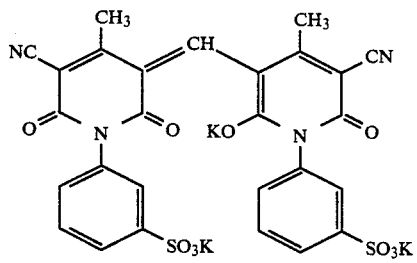
4.
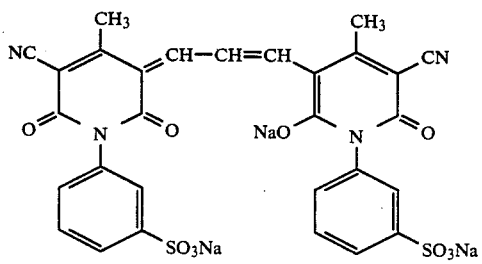
5.
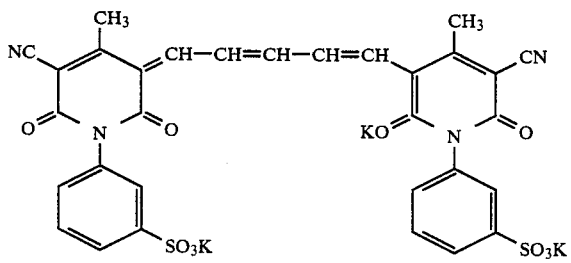
6.
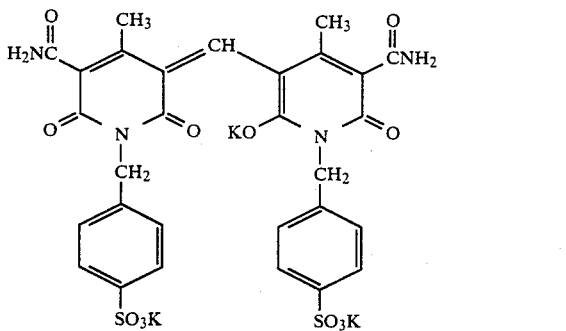
7.
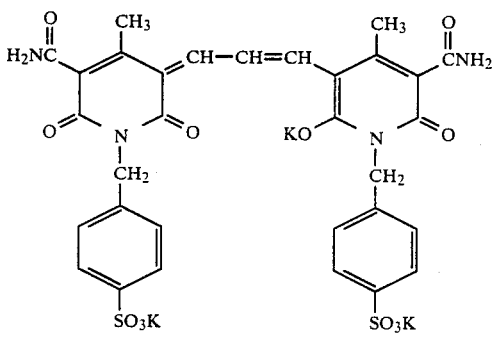
8.

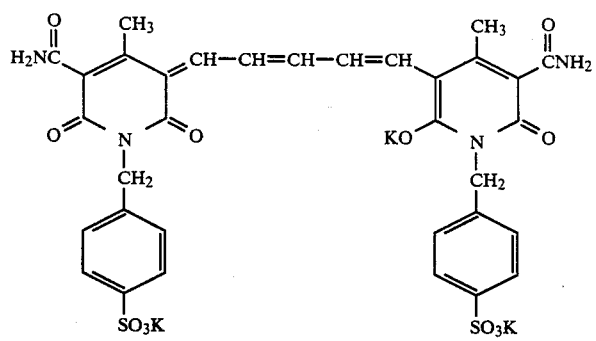
9.
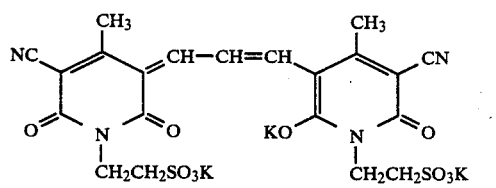
10.
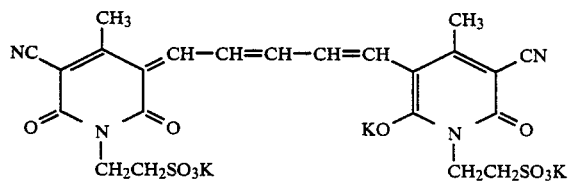
11.
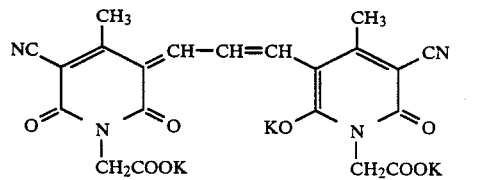
12.
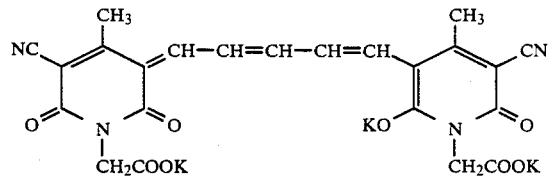
13.
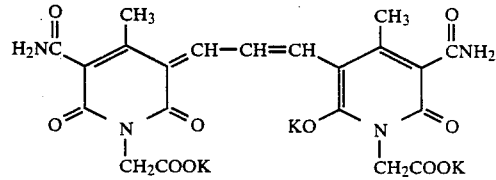
14.
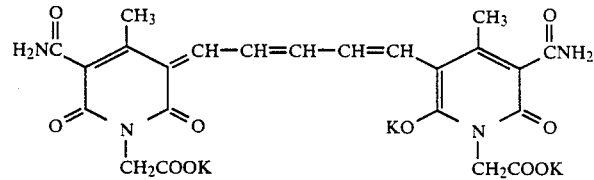
15.

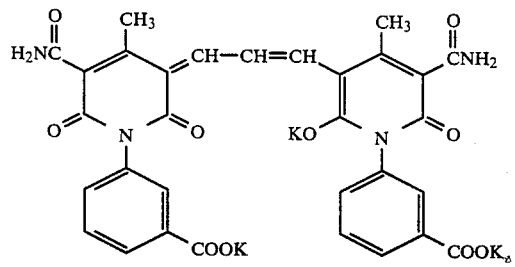
16.
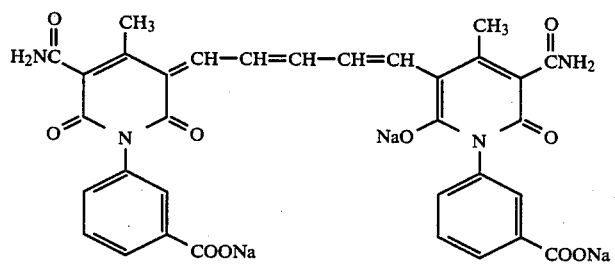
17.
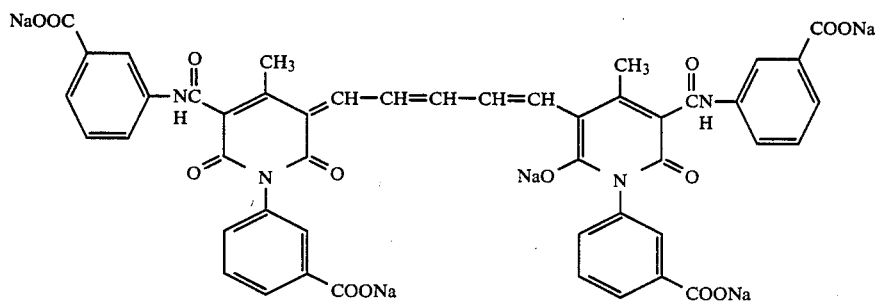
18.
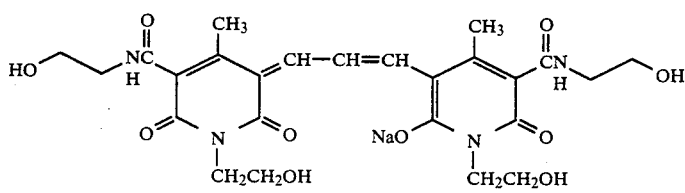
19.
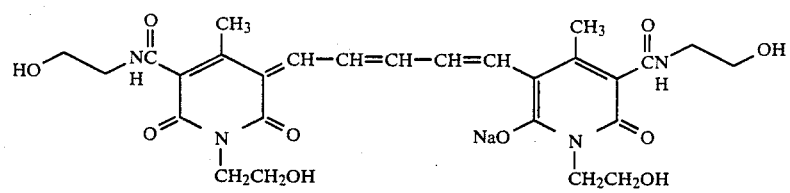
20.
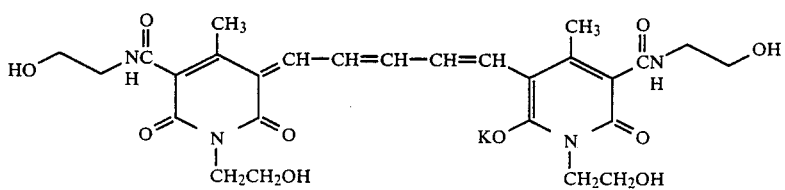
21.
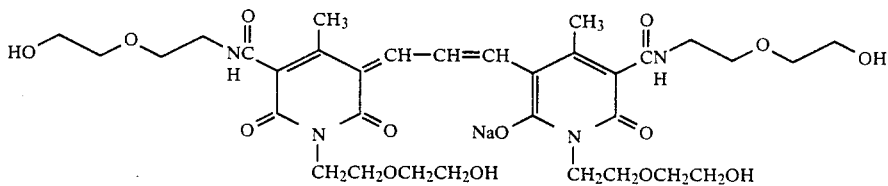
22.

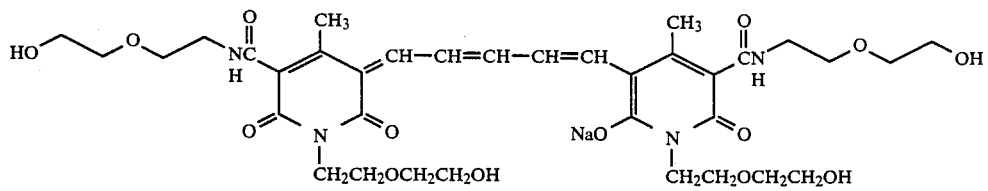
23.
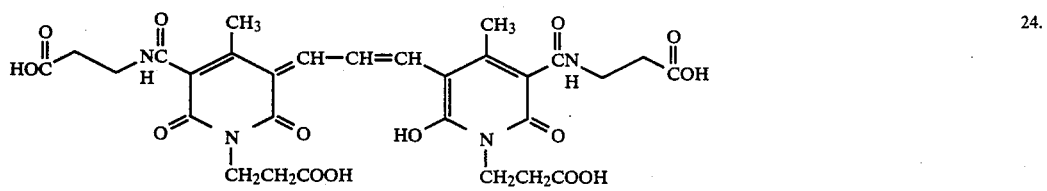
24.
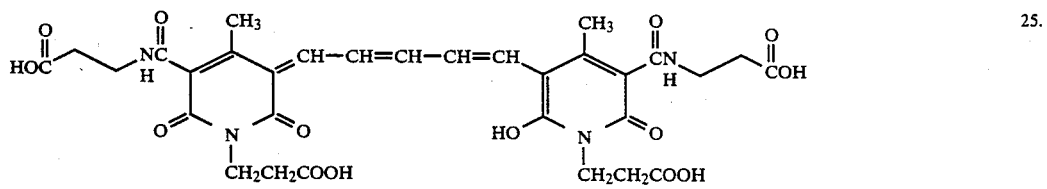
25.
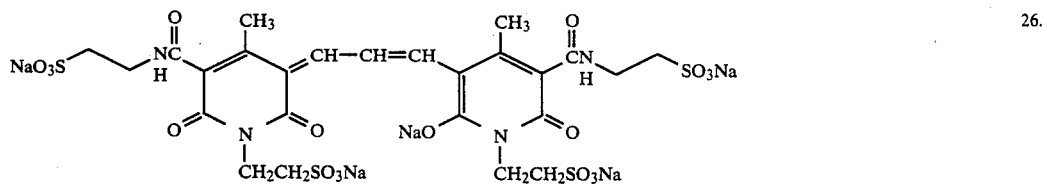
26.
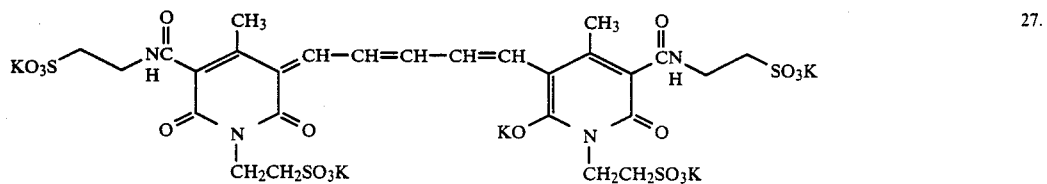
27.
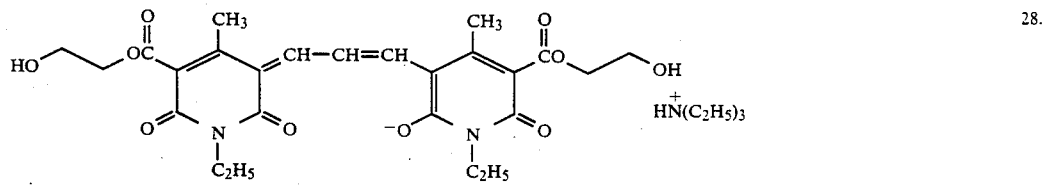
28.
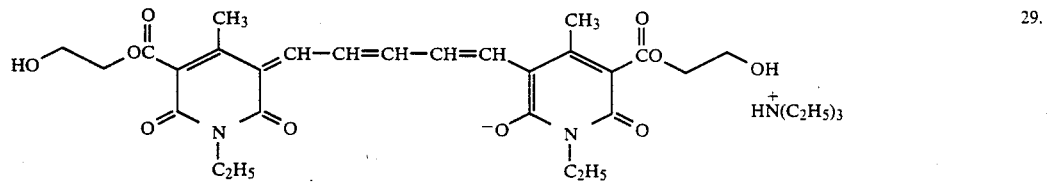
29.
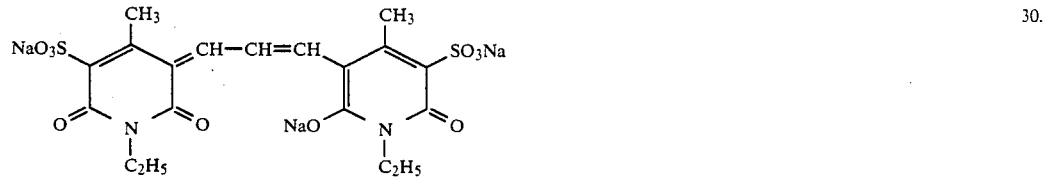
30.

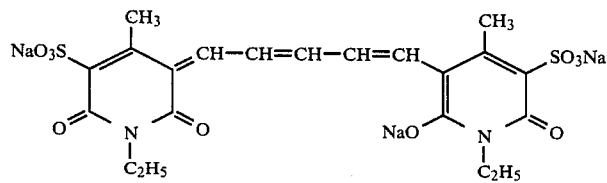
31.
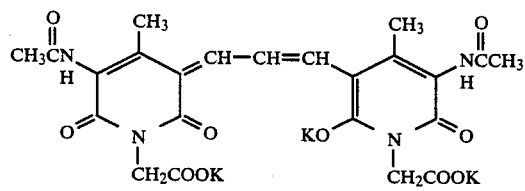
32.
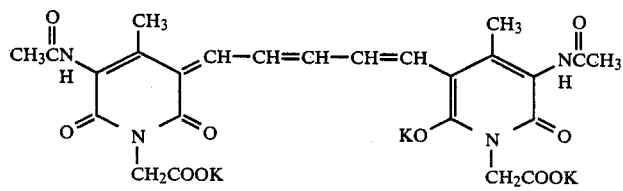
33.
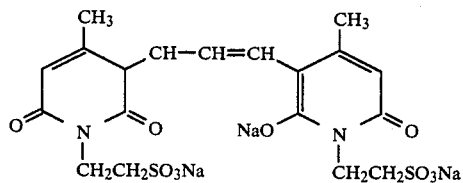
34.
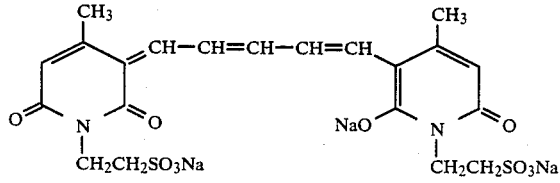
35.
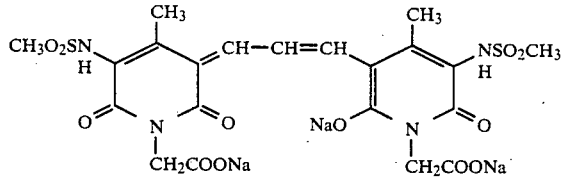
36.
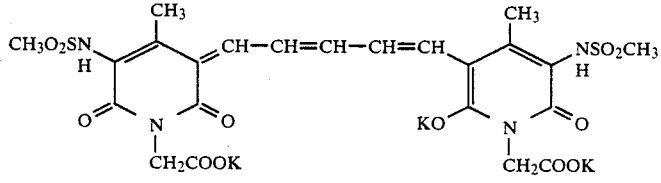
37.
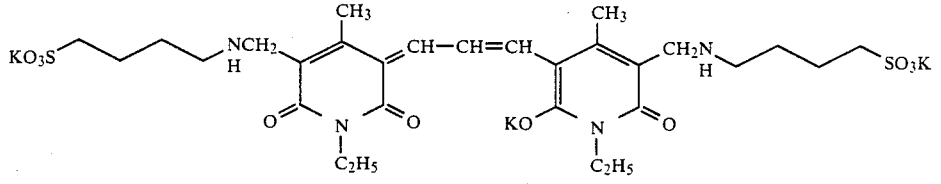
38.

-continued
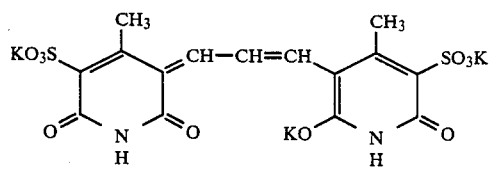 39.
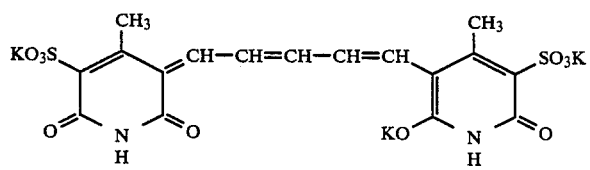 40.
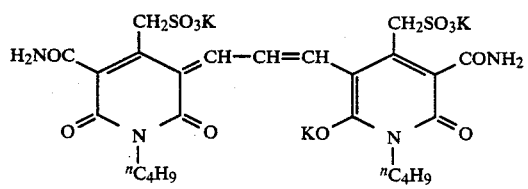 41.
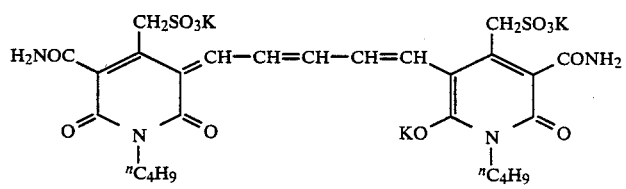 42.
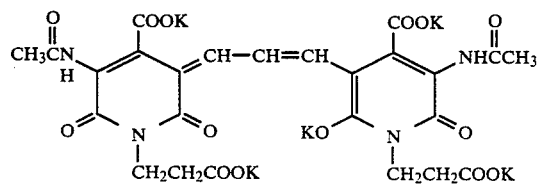 43.
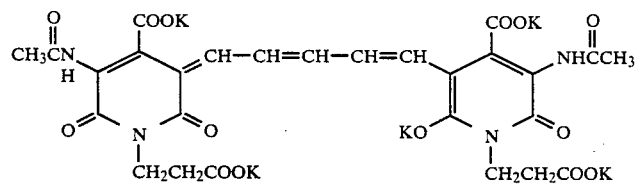 44.
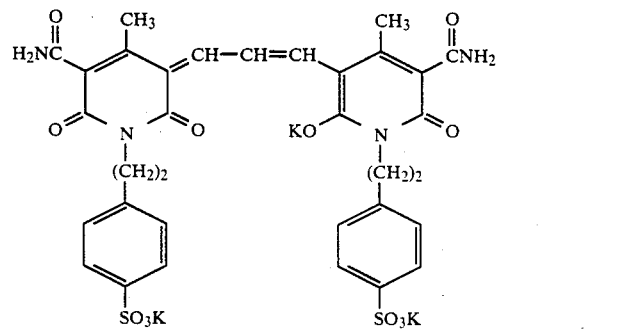 45.

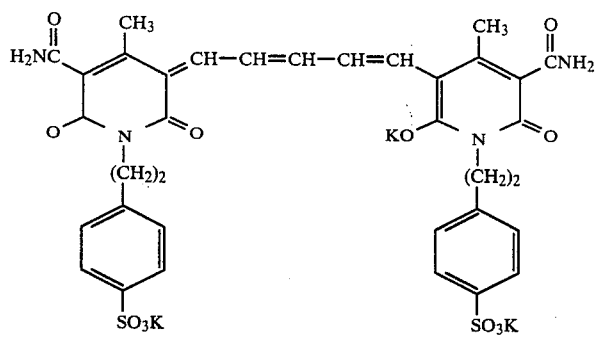
46.
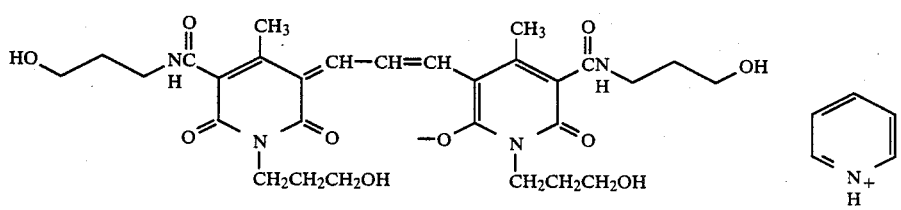
47.
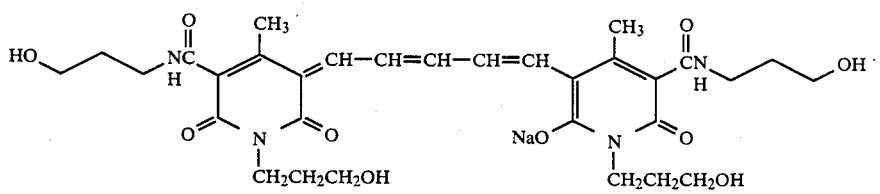
48.
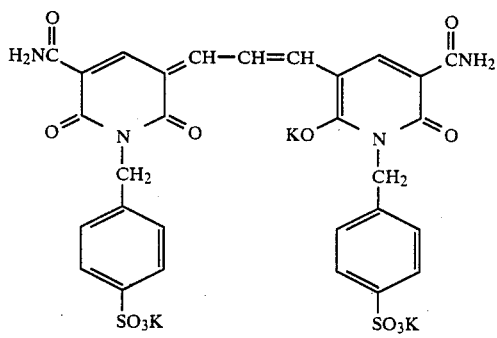
49.
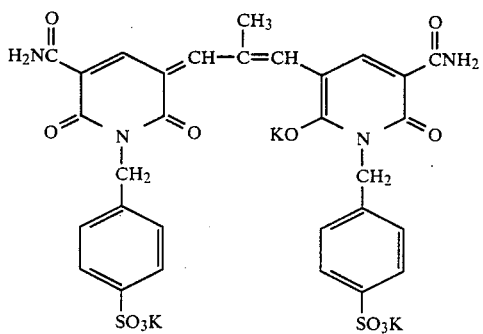
50.

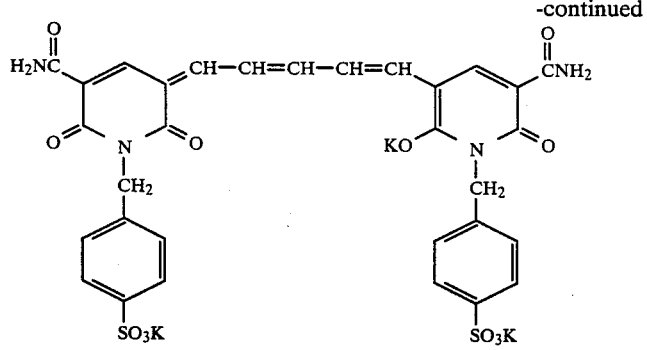

51.

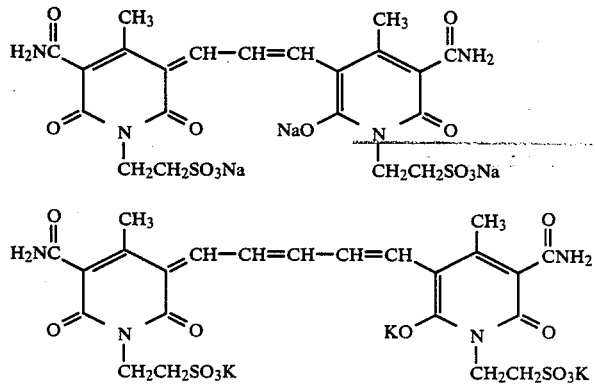

52.

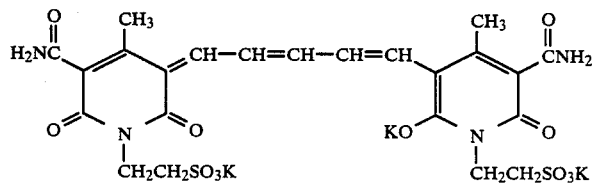

53.

Methods of synthesizing dyes will now be described specifically.

Synthesis of dye 10

A mixture of 10.0 g of 3-cyano-6-hydroxy-4-methyl-1-(2-sulfoethyl)pyrid-2-one, 7.7 g of potassium acetate, 2.6 g of 1,3,3-trimethoxypropene, and 100 ml of acetic acid was stirred at 70° C. for 5 hours. The produced precipitate was filtered and then was dissolved in 350 ml of distilled water, and 350 ml of methanol was added thereto. The resulting precipitate was filtered, washed with methanol, and then dried to give 7.7 g of dye 10. The melting point: 300° C. or over; $\lambda_{max}^{H2O}$: 590 nm.

Synthesis of dye 3

1.2 ml of acetic acid was added to a mixture of 3.0 g of 1-ethyl-6-hydroxy-4-methyl-3-sulfomethylpyrid-2-one, 1.4 g of pentadienedianil hydrochloride, 2.5 ml of triethylamine, and 80 ml of isopropyl alcohol, and the mixture was stirred at room temperature for 2 days. The produced precipitate was filtered and dissolved in a solvent mixture of 6 ml of distilled water and 18 ml of methanol, and 1.0 g of potassium acetate dissolved in 20 ml of ethanol was added thereto. The resulting precipitate was filtered, washed with ethanol, and dried to give 0.8 g of dye 3. The melting point: 300° C. or over; $\lambda_{max}^{H2O}$: 692 nm.

Synthesis of dye 45

15.0 g of 3-carbamoyl-6-hydroxy-4-methyl-1-(4-sulfophenetyl)pyrid-2-one, 4.5 g of propenedianil, and 11.9 ml of triethylamine were dissolved in 150 ml of methanol, then 8.0 ml of acetic anhydride was added to the solution and the resulting mixture was stirred at room temperature for 9 hours. Then a solution of 12.7 g of potassium acetate in 200 ml of ethanol was added thereto, and the produced precipitate was filtered, washed with methanol, and dried to give 6.3 g of dye 45. The melting point: 300° C. or over; $\lambda_{max}^{H2O}$: 586.

Synthesis of dye 17

4.5 ml of acetic anhydride was added to a mixture of 5.4 g of 3-carbamoyl-1-(3-carboxyphenyl)-6-hydroxy-4-methylpyrid-2-one, 2.4 g of pentadienedianil hydrochloride, 7.1 ml of triethylamine, and 50 ml of methanol, and the resulting mixture was stirred at room temperature for 18 hours. A solution of 4.7 g of sodium acetate in 150 ml of ethanol was added thereto, and the produced precipitate was filtered, washed with methanol, and dried to give 2.4 g of dye 17. The melting point: 300° C. or over; $\lambda_{max}^{H2O}$: 684 nm.

Synthesis of compound 23

10.8 ml of acetic anhydride was added to a mixture of 14.3 g of 6-hydroxy-1-2-(2-hydroxyethoxy)ethyl-3-N-2-(2-hydroxyethoxy)ethyl carbamoyl-4-methylpyrid-2-one sodium salt, 2.1 g of sodium acetate, 4.7 g of pentadienedianil hydrochloride, and 100 ml of methanol, and the resulting mixture was stirred at room temperature for 5 hours. 70 ml of ethyl acetate was added thereto, and the produced precipitate was filtered, washed with isopropyl alcohol, and dried to give 8.3 g of dye 23. The melting point: 169° to 172° C.; $\lambda_{max}^{H2O}$: 684 nm.

Synthesis of dye 14

A mixture of 32.5 g of 3-carbamoyl-1-carboxymethyl-6-hydroxy-4-methylpyrid-2-one, 22.2 g of potassium acetate, 9.5 g of 1,3,3-trimethoxypropene, and 300 ml of ethanol was heated under reflux for 3 hours and then cooled to room temperature. The produced precipitate was filtered, washed with methanol, and dried to give 17.7 g of dye 14. The melting point: 300° C. or over; $\lambda_{max}^{H2O}$: 586 nm.

When a dye represented by formula (I) is used as a filter dye, an antiirradiation dye, or an antihalation dye, although any effective amount can be used, it is preferable to use it in such a way that the optical density may be in the range of 0.05 to 3.0. The addition may be performed at any stage before the application.

The dye according to the present invention may be dispersed into an emulsion layer or other hydrophilic colloid layer (e.g., an intermediate layer, a protective layer, an antihalation layer, and a filter layer) in various known ways.

(1) The dye of the present invention may be dissolved or dispersed in a fine solid state directly into an emulsion layer or a hydrophilic colloid layer, or it may first be dissolved or dispersed in a fine solid state into an aqueous solution or a solvent, and then used in an emulsion or hydrophilic colloid layer. The dye of the present invention may be dissolved in a suitable solvent such as methyl alcohol, ethyl alcohol, propyl alcohol, methyl cellosolve, halogenated alcohols described in JP-A No. 9715/1973, and U.S. Pat. No. 3,756,830, acetone, water, and pyridine, and mixtures of these, and the solution may be added to an emulsion.

(2) A hydrophilic polymer having a charge opposite the dye ion is allowed to be present as a mordant in a layer, and by the interaction of the hydrophilic polymer with the dye molecule, the intended dye is permitted to be present locally in a specific layer.

As polymer mordants can be mentioned polymers having secondary and tertiary amino groups, polymers having nitrogen-containing heterocyclic moieties, and polymers having quaternary cation groups that have a molecular weight of 5,000 or over, particularly preferably 10,000 or over.

Examples are vinylpyridine polymers and vinylpyridinium cation polymers described, for example, in U.S. Pat. No. 2,548,564; vinylimidazolium cation polymers disclosed, for example, in U.S. Pat. No. 4,124,386; polymer mordants crosslinkable with gelatin or the like disclosed, for example, in U.S. Pat. No. 3,625,694; aqueous sol-type mordants disclosed, for example, in U.S. Pat. No. 3,958,995 and JP-A No. 115228/1979; water-insoluble mordants disclosed in U.S. Pat. No. 3,898,088; reactive mordants capable of forming a covalent bond with dyes disclosed, for example, in U.S. Pat. No. 4,168,976; polymers derived from ethylenically-unsaturated compounds having a dialkylaminoalkyl ester residue as described in British Pat. No. 685,475; products obtained by the reaction of polyvinyl alkyl ketones and aminoguanidine as disclosed in British Pat. No. 850,281; and polymers derived from 2-methyl-1-vinylimidazole as described in U.S. Pat. No. 3,445,231.

(3) The compounds may be dissolved using a surface-active agent.

Useful surface-active agents may be oligomers or polymers.

Details of these polymers are described in JP-A No. 158437/1985 (filed on Jan. 26, 1984 by Fuji Photo Film Co., Ltd.), pages 19 to 27.

To the hydrophilic colloid dispersion obtained as above may be added a hydrosol of a hydrophilic polymer described, for example, in JP-B No. 39835/1976.

As hydrophilic colloids, gelatin is mentioned typically, though any of other hydrophilic colloids hitherto known for use in photography can be used.

Silver halide emulsions used in the present invention are preferably silver bromide, silver bromoidide, silver bromochloroiodide, silver chlorobromide, and silver chloride.

In photographic material suitable for rapid processing, is one of preferable modes of the present invention, a so-called high silver chloride emulsion having a high silver chloride content is used. The silver chloride content of the high silver chloride emulsion is preferably 90 mol % or over, more preferably 95 mol % or over. The above-mentioned photographic material is preferably a color print photographic material.

In the high silver chloride emulsion, it is preferable to have a structure wherein a silver-bromidelocalized phase is present in the form of a layer or a non-layer in a silver halide grain and/or on the surface of a silver halide grain. The halogen composition of the above-mentioned localized phase is preferably such that the silver bromide content is at least 10 mol %, more preferably over 20 mol %. The localized phase may be present in the grain or on the edges, corners, or surface of the grain, and as a preferable example can be mentioned over wherein the localized phase is grown epitaxially on the corners of the grain.

The silver halide grains used in the present invention are in the form of regular crystals, such as cubic crystals, and octahedral crystals, or they are in the form of irregular crystals, such as spherical crystals, and tabular crystals, or a complex of these. A mixture of grains having various crystal forms may also be used, though it is preferable to use silver halide grains having a regular crystal form.

In the silver halide grains used in the present invention, the inside and surface layers may have different phases, or they may be made up of a uniform phase. The grains may be such that a latent image is formed mainly on the surface (e.g., a negative-type emulsion), or mainly inside the grains (e.g., an internal latent image-type emulsion and a previously-fogged direct reversal-type emulsion).

Preferably the silver halide emulsion used in the present invention is a tabular grain emulsion wherein the grains have a thickness of 0.5 μm or below, preferably 0.3 μm or below, and a diameter preferably of 0.6 μm or above, and grains having an average aspect ratio of 5 or greater occupy 50% or more of the total projected area, or a monodisperse emulsion wherein the statistical coefficient of deviation (the value S/d obtained by dividing the standard deviation S by the diameter d when the projected area is approximated to a circle) is 20% or below. Two or more of tabular grain emulsions and monodisperse emulsions may be mixed.

The photographic emulsions used in the present invention can be prepared by methods described, for example, by P. Glafkides in *Chimie et Physique Photographeque*, Paul Montel (1967), by G. F. Duffin in *Photographic Emulsion Chemistry*, Focal Press (1966), and by V. L. Zelikman et al. in *Making and Coating Photographic Emulsion*, Focal Press (1964).

When the silver halide grains are formed, in order to control the growth of the grains, as a silver halide solvent use can be made, for example, of ammonia, potassium thiocyanate, ammonium thiocyanate, thioether compounds described, for example, in U.S. Pat. Nos. 3,271,157, 3,574,628, 3,704,130, 4,297,439, and 4,276,374, thion compounds described, for example, in JP-A Nos. 144319/1978, 82408/1978, and 77737/1980, and amine compounds described, for example, in JP-A No. 100717/1979.

In the process of the formation or the physical ripening of the silver halide grains, cadmium salts, zinc salts, thallium salts, iridium salts or their complex salts, rhodium salts or their complex salts, or iron salts or iron complex salts may also be present.

Generally the silver halide emulsions are chemically sensitized. For the chemical sensitization, for example, methods described by H. Frieser in *Die Grundlagen der Photographischen Prozesse mit Silberhalogeniden*, (Akademische Verlags Gesellshaft 1986), pages 675 to 734 can be used.

In other words, a sulfur sensitization method that uses a compound containing sulfur (e.g., thiosulfates, thioureas, mercapto compounds, and rhodanine compounds) capable reacting with silver or active gelatin; a reduction sensitization method that uses a reducing substance (e.g., stannous salts, amines, hydrazine derivatives, formamidine sulfinic acid, and silane compounds); and a noble metal sensitization method that uses a noble metal compound (e.g., gold complex salts, and complex salts of metals of Group VIII of the Periodic Table, such as Pt, Ir, and Pd) can be used alone or in combination.

The silver halide photographic emulsion used in the present invention may contain various compounds to stabilize the photographic performance or to prevent fogging during photographic processing, storage, or manufacturing process of the photographic material. That is, compounds known as antifoggants or stabilizers can be added, such as azoles, for example benzothiazolium salts, nitroindazoles, triazoles, benzotriazoles, and benzimidazoles (particularly nitro- or halogen-substituted ones); heterocyclic mercapto compounds, such as mercaptothiazoles, mercaptobenzothiazoles, mercaptobenzimidazoles, mercaptothiadiazoles, mercaptotetrazoles (particularly for example 1-phenyl-5-mercaptotetrazole), and mercaptopyrimidines; the above-described heterocyclic mercapto compounds having a water-soluble group, such as a carboxyl group or a sulfon group; thioketo compounds such as oxazolinethion; azaindenes, for example, and tetrazaindenes (particularly 4-hydroxy-substituted (1,3,3a,7)tetrazaindenes); benzenethiosulfonic acids; and benzenesulfinic acids.

The silver halide photographic emulsion of the present invention can contain compounds for dispersing couplers and color couplers, such as cyan couplers, magenta couplers, and yellow couplers.

That is, compounds capable of forming colors by oxidative coupling with an aromatic primary amine developing agent (e.g., phenylenediamine derivatives and aminophenol derivatives) may be contained. For example, as magenta couplers can be mentioned 5-pyrazolone couplers, pyrazolobenzimidazole couplers, cyanoacetylcumarone couplers, pyrazolotriazole couplers, and open-chain acylacetonitrile couplers, with pyrazolotriazole couplers preferable; as yellow couplers can be mentioned acylacetamide couplers (e.g., benzoylacetanilides and pivaloylacetanilides), with pivaloylacetanilide couplers preferable; and as cyan couplers can be mentioned naphthol couplers and phenol couplers, with diacylaminophenol couplers and acylaminophenol couplers preferable. It is desirable that these couplers are nondiffusible with a hydrophobic group, which is called a ballasting group, in the molecule. The couplers may be four-equivalent or two-equivalent to a silver ion. The couplers may be colored couplers having a color-correcting effect or couplers that will release a development restrainer with the development (so-called DIR couplers).

Besides DIR couplers, colorless DIR coupling compounds, the product of the coupling reaction of which is colorless and which can release a development restrainer, may also be contained.

To increase the sensitivity, the contrast, and to accelerate development, the photographic emulsion of the present invention may contain, for example, polyalkyleneoxides or their derivatives, such as their ethers, esters, and amines, thioether compounds, thiomorpholines, quaternary ammonium salt compounds, urethane derivatives, urea derivatives, imidazole derivatives, and 3-pyrazolidones.

The silver halide photographic emulsion of the present invention may use, in addition to the dyes disclosed in the present invention, other known water-soluble dyes (e.g., oxonol dyes, hemioxonol dyes, and merocyanine dyes) as filter dyes for other various purposes, including the prevention of irradiation. Known cyanine dyes, merocyanine dyes, and hemicyanine dyes other than the dyes disclosed in the present invention may also be additionally used as spectral sensitizers.

The photographic emulsion of the present invention may contain a coating auxiliary and various surface-active agents for various purposes, for example an the antistat effect, improve slip characteristics, for emulsification and dispersion, to prevent adhesion, and to improve the photographic characteristics (e.g., the acceleration of development, high contrast, and sensitization).

Further, the photographic material of the present invention may contain an anti-discoloration additive, a hardener, a color fog-preventive agent, an ultraviolet absorber, and a protective colloid such as gelatin, and details of specific additives are described, for example, in *Research Disclosure* Vol. 176 (1978, VII) RD-17643.

The finished emulsion is applied on a suitable base, such as baryta paper, resin-coated paper, synthetic paper, triacetate film, polyethylene terephthalate film, other plastic base, or a glass plate.

Examples of the silver halide photographic material of the present invention include color print photographic materials, such as color positive films, color papers, color negative films, color reversal films (that may or may not include couplers), photographic materials for plate-making (e.g., lith films and lith dupe films), photographic materials for cathode ray tube display (e.g., photographic materials for emulsion X-ray recording and materials for direct and indirect photographing using a screen), photographic materials for the silver salt diffusion transfer process, photographic materials for the color diffusion transfer process, photographic materials for the imbibition transfer process, photographic materials used in the silver dye bleaching process, photographic materials for recording print-out images, photographic materials for direct print images, photographic materials for thermal development, and photographic materials for physical development, with color print photographic materials and positive-positive type color photographic materials particularly preferable.

Exposure for obtaining a photographic image is carried out using the usual processes. That is, any of various known light sources can be used, such as natural light (sunlight), a tungsten lamp, a fluorescent lamp, a mercury-arc lamp, a xenon-arc lamp, a carbon-arc lamp, a xenon flash lamp, and a cathode ray tube flying spot.

Generally the exposure time is 1/1000 sec to 30 sec, though an exposure time shorter than 1/1000 sec, for example, an exposure time of 1/10 to 1/10 sec using a xenon flash lamp or a cathode ray tube, can be used, and an exposure time longer than 30 sec can also be used. If necessary, the spectral composition of the light used in the exposure can be controlled using a color filter. The exposure can be effected using a laser beam. Also, the exposure can be effected by light released from a fluorescent substance excited, for example, with an electron beam, an X-ray, a γ-ray, and an α-ray.

Herein the term "positive-positive type silver halide color photographic material" means silver halide color photographic material that is used for forming a color positive image directly from a color positive original without requiring any intermediate medium, such as a negative. Without regard to its system, any of materials used for the above object belongs to the group of positive-positive type silver halide color photographic materials of the present invention. As examples of positive-positive type silver halide color photographic material of the present invention can be mentioned coupler-in-emulsion type color film, coupler-in-developer type color film, color duplicating film, color reversal paper used in the reversal processing system, autopositive color film and autopositive color paper in the autopositive system, instant film, and diffusion-transfer type dry color paper used in the diffusion transfer system, but the present invention is not limited to them.

Preferable modes of the positive-positive type silver halide color photographic material of the present invention are:

(1)-(i): the wavelength exhibiting the maximum sensitivity of the spectral sensitivity of the redsensitive emulsion layer is on the side where the wavelength is longer than 580 nm, and of the wavelength corresponding to a sensitivity of 30% of the maximum sensitivity of its spectral sensitivity, the wavelength on the shortest wavelength side is on the side where the wavelength is longer than 560 nm, and (1)-(ii): the wavelength exhibiting the maximum sensitivity of the spectral sensitivity of the green-sensitive emulsion layer is on the side where the wavelength is shorter than 580 nm, and of the wavelength corresponding to a sensitivity of 30% of the maximum sensitivity of its spectral sensitivity, the wavelength on the longest wavelength side is on the side where the wavelength is shorter than 590 nm.

The method of defining and expressing the relative sensitivity of the spectral sensitivity in each wavelength was according to the method described by H. James in *The Theory of the Photographic Process*, Vol. 4, page 510.

More preferably, the present invention provides a positive-positive type silver halide color photographic material wherein;

(i) the wavelength exhibiting the maximum sensitivity of the spectral sensitivity of the red-sensitive emulsion layer is on the side where the wavelength is longer than 600 nm, and of the wavelength corresponding to a sensitivity of 30% of the maximum sensitivity of its spectral sensitivity, the wavelength on the shortest wavelength side is on the side where the wavelength is longer than 590 nm, and (ii) the wavelength exhibiting the maximum sensitivity of the spectral sensitivity of the green-sensitive emulsion layer is on the side where the wavelength is shorter than 560 nm, and of the wavelength corresponding to a sensitivity of 30% of the maximum sensitivity of its spectral sensitivity, the wavelength on the longest wavelength side is on the side where the wavelength is shorter than 570 nm.

In the above preferable mode, with respect to the wavelength exhibiting the maximum sensitivity of the spectral sensitivity of each color-sensitive emulsion layer, and with respect to the wavelength, which are not on the specified side, corresponding to a sensitivity of 30% of the maximum sensitivity of its spectral sensitivity, they may be selected within the range where the performance of the positive-positive type silver halide color photographic material is satisfied. For example, the wavelength exhibiting the maximum sensitivity of the spectral sensitivity of the red-sensitive emulsion is generally on the side where the wavelength is shorter than 700 nm, and it is preferable that of wavelengths corresponding to a sensitivity of 30% of the maximum sensitivity of its spectral sensitivity, the wavelength on the longer wave side is on the side where the wavelength is shorter than 750 nm.

In British Pat. No. 1,278,621, the synthesis method and the use of oxonol dyes are described, and although the applications of the dyes in photographic systems are mentioned generally, it does not describe positive-positive type silver halide color photographic materials at all.

British Pat. No. 1,521,083 describes the use of hydroxypyridoneoxonol dyes in photographic materials. According to the application of the comounds described in that patent, as is apparent from the description and Examples, an antihalation layer having a broad absorption all over the visible range is formed. In view of the effect in the positive-positive type silver halide color photographic material of the present invention, it utilizes a quite opposite property.

According to a preferable mode, the positive-positive type silver halide color photographic material of the present invention contains a dye represented by formula (I) and at least one red-sensitive silver halide emulsion layer that has been sensitized with one or a combination of two or more sensitizing dyes represented by the following formula (IV):

Formula (IV)

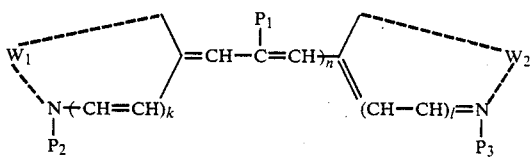

wherein $W_1$ and $W_2$ each represent a group of non-metallic atoms required to form a 5- or 6-membered heterocyclic ring to which a benzene ring or a naphthalene ring is condensed; $P_1$ represent a hydrogen atom, a substituted or unsubstituted alkyl group, an aralkyl group, or a substituted or unsubstituted aryl group; $P_2$ and $P_3$ each represent an alkyl group, a sulfo group, a hydroxy group, a carboxy group, a sulfophenyl group, a carboxyphenyl group, an alkoxy group, a phenyl group, or an alkyl group substituted with a halogen atom, at least one of $P_2$ and $P_3$ represents a group having a hydroxy group, a sulfo group, or a carboxy group; n is 0, 1, or 2; k and l each are 0 or 1, provided that $n+k+l\neq 0$.

To use compounds represented by formula (IV) alone or in combination as the sensitizing dye of a red-sensitive emulsion layer is effective with a view to broadening the spectral sensitivity distribution and to improving the color reproduction. However, it is known that these dyes are desorbed from a silver halide by other dyes also present in the photoraphic material immediately after the coating or over time. For example, it was observed that when a dye described in JP-A No. 20830/1977 is used, the photographic material desensitized over time, thereby changing the photographic characteristics. According to the present invention, a positive-positive type silver halide color photographic material that contains a dye represented by formula (I) and is improved in color reproduction can be obtained without such desorption of a dye.

According to a preferable mode of the present invention, the positive-positive type silver halide color photographic material of the present invention includes at least one red-sensitive emulsion layer and a dye represented by formula (I) in the red-sensitive emulsion layer or in one or more layers that are nearer to the incident light at the time of printing than the red-sensitive emulsion layer. The dye represented by formula (I) is contained in one or more of the layers mentioned above, and it also may be contained in other layers.

According to the above-mentioned mode of the present invention, it is preferable that a dye represented by formula (I) has a spectral absorption with a half-width limited within a wavelength required for the purpose, and if the absorption band is too broad, it is not preferable, because it results in unrequired lowering of the sensitivity of the red-sensitive emulsion layer.

According to a preferable mode of the present invention, the positive-positive type silver halide color photographic material of the present invention contains, of the dyes represented by formula (I), a dye whose absorption maximum is between 550 nm and 650 nm, and whose half-width is up to 120 nm.

According to another preferable mode of the present invention, the positive-positive type silver halide color photographic material of the present invention contains, of the dyes represented by formula (I), a dye whose absorption maximum is between 450 nm and 550 nm, and whose half-width is up to 120 nm.

Herein the absorption maximum and the half-width mentioned above are values obtained when the coating amount is adjusted in such a way that a gelatin solution containing a dye represented by formula (I) is applied onto a transmitting base in a gelatin coating amount of 5 g/m$^2$, and the density value of the dye represented by formula (I) at the absorption maximum is 1.

Preferably, the dye represented by formula (I) used in accordance with this preferable mode is one that would not agglomerate in the gelatin layer and is relatively high in solubility. The conventional use are dyes that agglomerate in a gelatin layer and that cover all of the visible range, whereas the present invention utilizes an effect opposite from such dyes.

It is preferable that the amount of dye represented by formula (I) to be contained in the positive-positive type silver halide color photographic material of the present invention is such that the spectral absorption density in its absorption maximum wavelength is at least 0.3. It is suitable that the amount of dye that is to be contained to give such an absorption density range is 1 to 1000 mg/m$^2$, preferably 5 to 250 mg/m$^2$. The amount of the dye to be used is determined within a range required to improve color reproduction.

According to a preferable mode of the present invention, the positive-positive type silver halide color photographic material of the present invention is one that contains a dye represented by formula (I), and it will be exposed to light through Y, M, and C filters using a substractive color process from a color-positive original.

According to a preferable mode of the present invention, the positive-positive type silver halide color photographic material of the present invention is a color reversal paper that contains a dye represented by formula (I).

The general constitutions of two types of color reversal papers are given below.

Constitution 1:
(1) Antiabration layer
(2) UV-absorbing compound layer
(3) Blue-sensitizing emulsion+yellow dye-forming coupler
(4) Intermediate layer
(5) Green-sensitizing emulsion+magenta dye-forming coupler
(6) Intermediate layer
(7) Red-sensitizing emulsion+cyan dye-forming coupler
(8) Polyethylene-coated paper base Constitution 2:
(1) Antiabration layer
(2) UV-absorbing compound layer
(3) Green-sensitizing emulsion+magenta dye-forming coupler
(4) Intermediate layer
(5) Red-sensitizing emulsion+cyan dye-forming coupler
(6) Intermediate layer
(7) Blue-sensitizing emulsion+yellow dye-forming coupler
(8) Polyethylene-coated paper base In constitution 2, silver bromoiodide constituting tabular grains is used so that the red- and green-sensitizing emulsions may be low in sensitivity to blue light. Silver bromodiodide emulsions having tabular grains are well known and are described, for example, in JP-A No. 113928/1983 and U.S. Pat. No. 4,434,226.

The dye represented by formula (I) in the present invention may be used in one or more of any layers of constitutions 1 and 2.

Further, the dye is preferably used in each of the red-sensitive emulsion layers of constitutions 1 and 2, and in one or more layers that are nearer to the exposing incident light than the red-sensitive emulsion layer.

Each of said layers may be provided with it separated into two or more layers if required.

In a sense that color reversal paper uses, in addition to prints from slides, a variety of originals, such as print from print, print from printed matter and print from substances, it is a typical photographic material having difficulty in designing desired spectral sensitivities involved in positive-positive type print photographic materials, as mentioned above.

According to a preferable mode of the present invention, the positive-positive type silver halide color photographic material of the present invention is an autopositive color film and an autopositive color paper that contains a dye represented by formula (I).

These photographic materials are also typical photographic materials having difficulty in designing desired spectral sensitivities, as similar as color reversal papers.

The present invention will now be further described in detail with reference to Examples.

EXAMPLE 1

To 30 ml portions of a 10% aqueous gelatin solution were added either an aqueous solution of a dye of the present invention or a comparative dye described below (the concentration being $4 \times 10^{-2}$ mol/5 ml of water), plus 1.25 ml of a 10% aqueous saponin solution and 0.75 ml of a 1% formalin solution, and then distilled water was added to make 50.0 ml. Each of the dye thus-prepared solutions was applied onto a subbed cellulose triacetate film base and dried to prepare a sample.

Comparative dye A

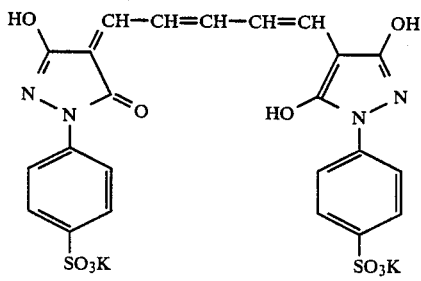

Comparative dye B

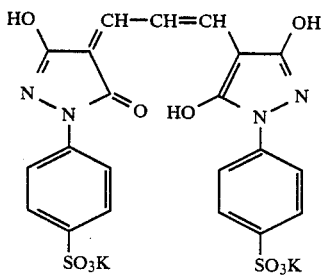

Comparative dye C

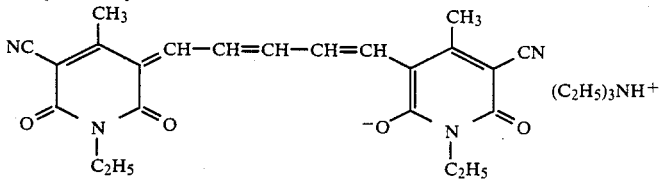

Comparative dye D

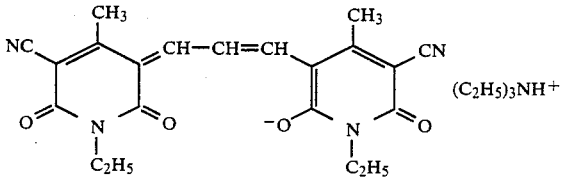

Each of the samples was dipped in a developer having the composition shown below for 1 min at 30° C., and then each sample was washed with water for 10 sec and dried. The visible spectra of the samples before and after the dipping in the developer were measured, and the decoloring rates were found from the optical densities at the maximum absorption wavelengths. The results and the absorption maximum wavelengths in the gelatin film are shown in Table 1.

| Composition of developing solution | |
|---|---|
| p-methylaminophenol sulfate | 1 g |
| Sodium sulfite anhydride | 15 g |
| Hydroquinone | 4 g |
| Sodium carbonate monohydrate | 27 g |
| Potassium bromide | 0.7 g |
| Water to make | 1000 ml |

TABLE 1

| Sample No. | Dye | Absorption maximum wavelength in gelatin film (nm) | Discoloring rate (%) |
|---|---|---|---|
| 1 | Dye 3 (of this invention) | 713 | 100 |
| 2 | Dye 15 (of this invention) | 702 | 100 |
| 3 | Dye 20 (of this invention) | 703 | 99 |
| 4 | Dye 10 (of this invention) | 602 | 99 |
| 5 | Dye 12 (of this invention) | 603 | 97 |
| 6 | Dye 14 (of this invention) | 599 | 99 |
| 7 | Comparative dye A | 605 | 73 |
| 8 | Comparative dye B | 501 | 65 |

TABLE 1-continued

| Sample No. | Dye | Absorption maximum wavelength in gelatin film (nm) | Discoloring rate (%) |
|---|---|---|---|
| 9 | Comparative dye C | 697 | 92 |
| 10 | Comparative dye D | 603 | 88 |

As is apparent from Table 1, it was found that the dyes according to the invention exhibited excellent discolorability in comparison with the known comparative dyes. Although the samples containing comparative dyes (A and B) rendered the processing solution colored due to the dissolving-out of the dyes, the dyes according to the invention were free from such coloring contamination.

EXAMPLE 2

A sample for a multi-color print having the layer constitution shown below was formed on a paper substrate, both surfaces of which were laminated with polyethylene.

Layer constitution

The composition of each of the layers is shown below. Each given numeral represents the coating amount (g/m$^2$). For the silver halide emulsion, the coating amount is given in terms of silver.

Substrate

Polyethylene-laminated paper [the polyethylene on the first-layer side contained a white pigment (TiO$_2$) and a bluish dye (ultramarine blue)]

| First layer (blue-sensitive silver halide emulsion layer) | |
|---|---|
| Monodisperse silver chlorobromide emulsion (EM-1) plus a spectral sensitizer (Sen-1) | 0.16 |
| Monodisperse silver chlorobromide emulsion (EM-2) plus a spectral sensitizer (Sen-2) | 0.10 |
| Antifoggant (Cpd-1) | 0.004 |
| Gelatin | 1.83 |
| Yellow coupler (ExY-1) | 0.83 |
| Image dye stabilizer (Cpd-2) | 0.03 |
| Polymer (Cpd-3) | 0.08 |
| Solvent (Solv-1 and Solv-2; 1:1 volume ratio) | 0.35 |
| Hardener (H-1) | 0.02 |
| Second layer (color-mix inhibiting layer) | |
| Gelatin | 1.25 |
| Color-mix inhibitor (Cpd-4) | 0.04 |
| Solvent (Solv-3 and Solv-4; 1:1 volume ratio) | 0.20 |
| Hardener (H-1) | 0.02 |
| Third layer (green-sensitive silver halide emulsion layer) | |
| Monodisperse silver chlorobromide emulsion (EM-3) plus spectral sensitizers (Sen-2 and -3) | 0.05 |
| Monodisperse silver chlorobromide emulsion (EM-4) plus spectral sensitizers (Sen-2 and -3) | 0.11 |
| Antifoggant (Cpd-5) | 0.001 |
| Gelatin | 1.79 |
| Magenta coupler (ExM-1) | 0.32 |
| Image dye stabilizer (Cpd-6) | 0.20 |
| Image dye stabilizer (Cpd-7) | 0.03 |
| Image dye stabilizer (Cpd-8) | 0.03 |
| Solvent (Solv-3 and Solv-5; 1:2 volume ratio) | 0.65 |
| Hardener (H-1) | 0.01 |
| Fourth layer (ultraviolet-absorbing layer) | |
| Gelatin | 1.58 |
| Ultraviolet absorber (UV-1/-2/-3; 1:4:4 molar ratio) | 0.62 |
| Color-mix inhibitor (Cpd-4) | 0.05 |
| Solvent (Solv-6) | 0.34 |
| Hardener (H-1) | 0.01 |
| Fifth layer (red-sensitive silver halide emulsion layer) | |
| Monodisperse silver chlorobromide emulsion (EM-5) plus spectral sensitizers (Sen-4 and -5) | 0.07 |
| Monodisperse silver chlorobromide emulsion (EM-6) plus spectral sensitizers (Sen-4 and -5) | 0.15 |
| Antifoggant (Cpd-9) | 0.0002 |
| Gelatin | 1.34 |
| Cyan coupler (ExC-1) | 0.15 |
| Cyan coupler (ExC-2) | 0.18 |
| Ultraviolet absorber (UV-1/-3/-4; 1:3:3 molar ratio) | 0.17 |
| Polymer (Cpd-3) | 0.33 |
| Solvent (Solv-1) | 0.23 |
| Hardener (H-1) | 0.01 |
| Sixth layer (ultraviolet-absorbing layer) | |
| Gelatin | 0.53 |
| Ultraviolet absorber (UV-1/2/3; 1:4:4 molar ratio) | 0.21 |
| Solvent (Solv-6) | 0.08 |
| Hardener (H-1) | 0.01 |
| Seventh layer (protective layer) | |
| Gelatin | 1.33 |
| Acryl-modified polyvinyl alcohol copolymer (modification degree: 17%) | 0.17 |
| Liquid paraffin | 0.03 |

Details of the materials used in the above samples are shown below, and details of the silver halide emulsions used are shown in Table 2.

TABLE 2

| Emulsion | Shape | Average grain diameter (μm) | Br content (mol %) | Deviation coefficient |
|---|---|---|---|---|
| EM-1 | cubic | 0.96 | 80 | 0.06 |
| EM-2 | cubic | 0.64 | 80 | 0.07 |
| EM-3 | cubic | 0.52 | 95 | 0.08 |
| EM-4 | cubic | 0.40 | 95 | 0.09 |
| EM-5 | cubic | 0.44 | 70 | 0.09 |
| EM-6 | cubic | 0.36 | 70 | 0.08 |

Deviation coefficient = standard deviation/average grain diameter.

$6 \times 10^{-4}$ mol/mol.Ag (Sen-1)

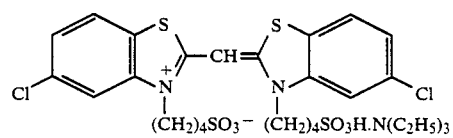

$4 \times 10^{-4}$ mol/mol.Ag (Sen-2)

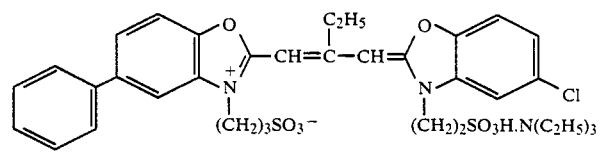

$8 \times 10^{-5}$ mol/mol.Ag (Sen-3)
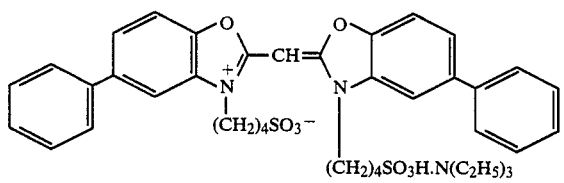
$1.8 \times 10^{-4}$ mol/mol.Ag (Sen-4)
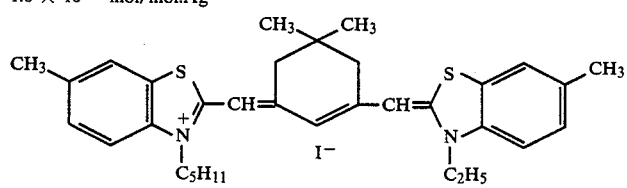
$3 \times 10^{-3}$ mol/mol.Ag (Sen-5)
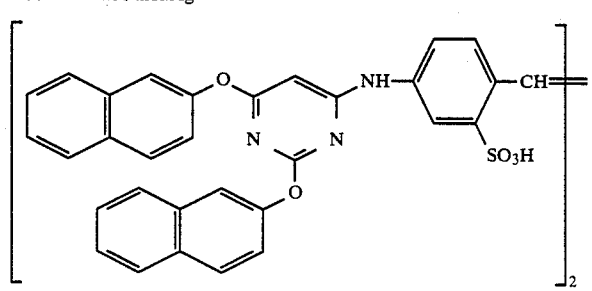
(ExY-1)
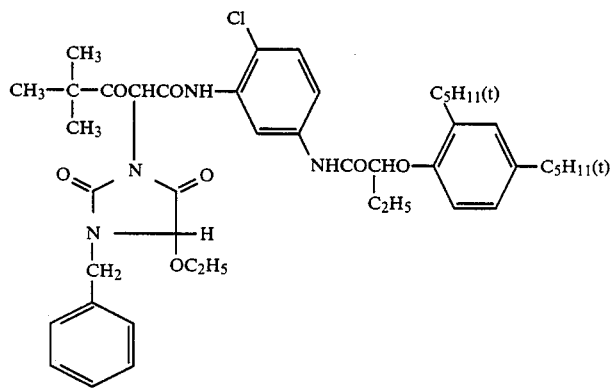
(ExM-1)
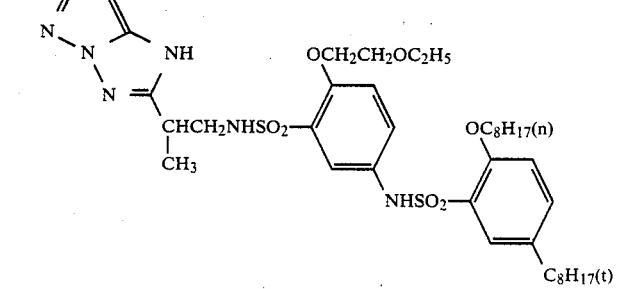
(ExC-1)
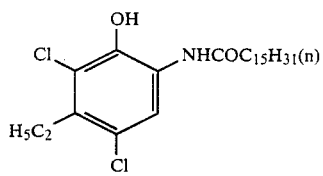

-continued
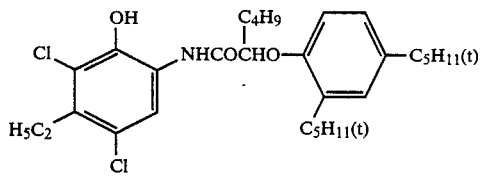 (ExC-2)
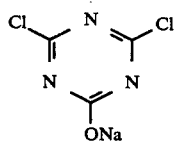 (H-1)
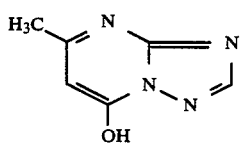 (Cpd-1)
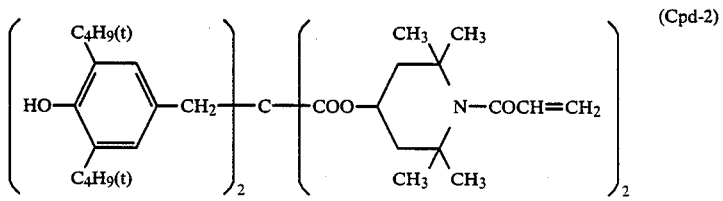 (Cpd-2)
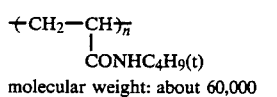 (Cpd-3)
molecular weight: about 60,000
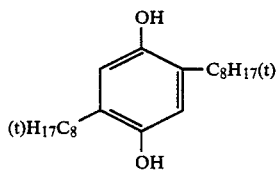 (Cpd-4)
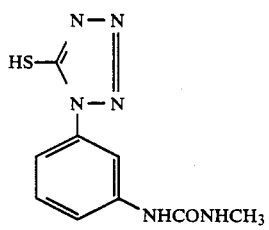 (Cpd-5)
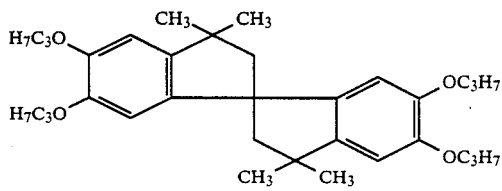 (Cpd-6)
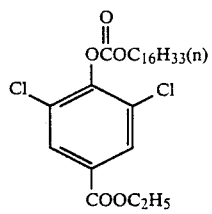 (Cpd-7)

-continued
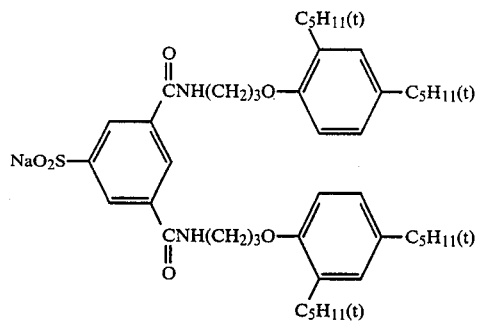
(Cpd-8)
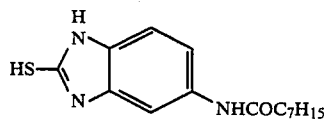
(Cpd-9)
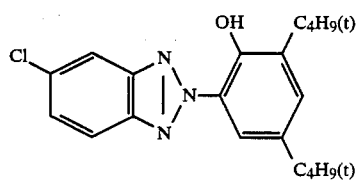
(UV-1)
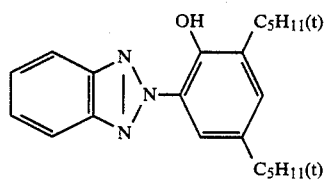
(UV-2)
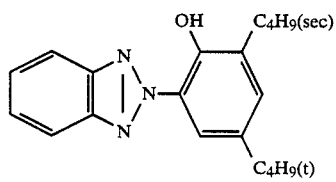
(UV-3)
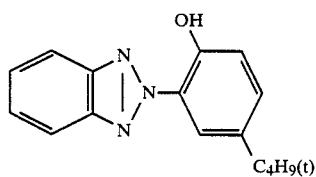
(UV-4)
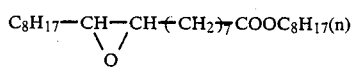
(Solv-1)
(Solv-2)
O=P+OC$_9$H$_{19}$(iso))$_3$
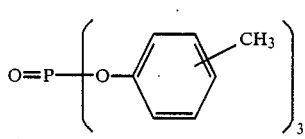
(Solv-3)
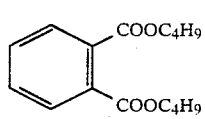
(Solv-4)
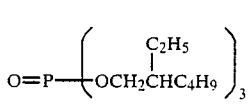
(Solv-5)

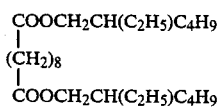
(Solv-6)

By adding dyes of the present invention and comparative dyes to the fourth layer given above, Samples (11) to (17) were prepared, and Sample (18) that did not contain such a dye was also prepared.

The amount of the dye was added was $2\times 10^{-5}$ mol/m$^2$ in each case.

TABLE 3

| Sample No. | Dye |
| --- | --- |
| 11 | dye 9 (of this invention) |
| 12 | dye 23 (of this invention) |
| 13 | dye 12 (of this invention) |
| 14 | dye 14 (of this invention) |
| 15 | dye 45 (of this invention) |
| 16 | comparative dye E |
| 17 | comparative dye C |
| 18 | without dye |

Comparative dye E

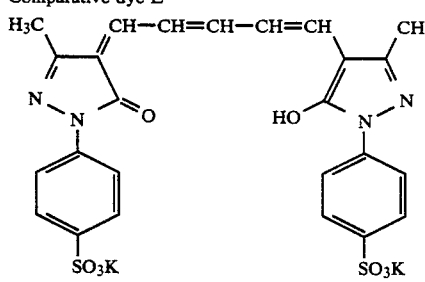

The fogging and stability of the dye in the film with respect to Samples (11) to (17) were examined. Stability was assessed in terms of the remaining rate of the dye after the raw samples were allowed to stand for 2 weeks at 35° C. and 80% humidity. The fogging was assessed by comparing Samples (11) to (17) with Sample (18) with respect to the green-sensitive layers after the raw samples had stood at 35° C. and 80% humidity for 2 weeks and were subjected to the following processes. The results of the assessment are shown in Table 4.

| Processing steps | Temperature | Time |
| --- | --- | --- |
| Color development | 33° C. | 3 min 30 sec |
| Bleach-fixing | 33° C. | 1 min 30 sec |
| Washing | 24 to 34° C. | 3 min |
| Drying | 70 to 80° C. | 1 min |

The compositions of the processing solutions used were as follows:

| Color developing solution | |
| --- | --- |
| Water | 800 ml |
| Nitriotriacetic acid | 1.5 g |
| Diethylenetriaminetetraacetic acid | 1.0 g |
| Benzyl alcohol | 15 ml |
| Diethylene glycol | 10 ml |
| Sodium sulfite | 2.0 g |
| Potassium bromide | 0.5 g |
| Potassium carbonate | 30 g |
| N-ethyl-N-(β-methanesulfonamidoethyl)-3-methyl-4-aminoaniline sulfate | 5.0 g |
| Hydroxylamine sulfate | 4.0 g |
| Brightening agent (WHITEX 4B, manufactured by Sumitomo Chemical Co., Ltd.) | 1.0 g |
| Water to make | 1000 ml |
| pH (25° C.) | 10.20 |
| Bleach-fixing solution | |
| Water | 400 ml |
| Ammonium thiosulfate (70%) | 150 ml |
| Sodium sulfite | 18 g |
| Ethylenediaminetetraacetic acid iron (III) ammonium | 55 g |
| Ethylenediaminetetraacetic acid disodium | 5 g |
| Water to make | 1000 ml |
| pH (25° C.) | 6.70 |

TABLE 4

| Sample No. | Remaining ratio of dye | Fogging |
| --- | --- | --- |
| 11 | 93% | 0.01 |
| 12 | 91% | 0.01 |
| 13 | 97% | 0.02 |
| 14 | 99% | 0.01 |
| 15 | 99% | 0.02 |
| 16 | 88% | 0.03 |
| 17 | 83% | 0.02 |
| 18 | — | 0.01 |

As is apparent from the results in Table 4, the samples that used the present invention are excellent in stability in the film, and the fogging of the samples that used the present invention is less.

EXAMPLE 3

Similar to Example 2, samples having the following layer constitution were prepared. In the compositions the same materials as in Example 2 are shown by the same symbol as in Example 2. Details of materials of the other symbols are shown below.

| First layer (blue-sensitive silver halide emulsion layer) | |
| --- | --- |
| Monodisperse silver chlorobromide emulsion (EM-7) plus a spectral sensitizer (Sen-6) | 0.27 |
| Gelatin | 1.86 |
| Yellow coupler (ExY-1) | 0.82 |
| Solvent (Solv-4) | 0.35 |
| Hardener (H-1) | 0.02 |
| Second layer (color-mix inhibiting layer) | |
| Gelatin | 0.99 |
| Color-mix inhibitor (Cpd-4) | 0.06 |
| Solvent (Solv-3 and Solv-4; 1:1 volume ratio) | 0.12 |
| Hardener (H-1) | 0.02 |
| Third layer (green-sensitive silver halide emulsion layer) | |
| Monodisperse silver chlorobromide emulsion (EM-8) plus spectral sensitizers (Sen-7 and 3) | 0.45 |
| Gelatin | 1.24 |
| Magenta coupler (ExM-2) | 0.35 |
| Image dye stabilizer (Cpd-6) | 0.20 |
| Image dye stabilizer (Cpd-7) | 0.03 |
| Image dye stabilizer (Cpd-8) | 0.03 |
| Solvent (Solv-3 and Solv-5; 1:2 volume ratio) | 0.65 |
| Hardener (H-1) | 0.01 |
| Fourth layer (ultraviolet-absorbing layer) | |
| Gelatin | 1.58 |
| Ultraviolet absorber (UV-1/-2/-3; 1:4:4 molar ratio) | 0.62 |
| Color-mix inhibitor (Cpd-4) | 0.05 |
| Solvent (Solv-6) | 0.34 |
| Hardener (H-1) | 0.01 |
| Fifth layer (red-sensitive silver halide emulsion layer) | |

-continued

| | |
|---|---|
| Monodisperse silver chlorobromide emulsion (EM-9) plus spectral sensitizers (Sen-4 and -5) | 0.20 |
| Gelatin | 0.92 |
| Cyan coupler (ExC-3) | 0.15 |
| Cyan coupler (ExC-4) | 0.18 |
| Ultraviolet absorber (UV-1/-2/-3; 1:3:3 molar ratio) | 0.17 |
| Solvent (Solv-4) | 0.20 |
| Hardener (H-1) | 0.01 |

TABLE 5

| Emulsion | Shape | Average grain diameter (μm) | Br content (mol %) | Deviation coefficient |
|---|---|---|---|---|
| EM-7 | cubic | 0.85 | 0.6 | 0.10 |
| EM-8 | cubic | 0.45 | 1.0 | 0.09 |
| EM-9 | cubic | 0.34 | 1.8 | 0.10 |

Deviation coefficient = standard deviation/average grain diameter.

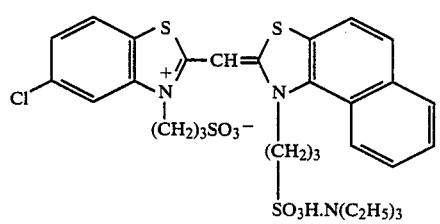
(Sen-6)

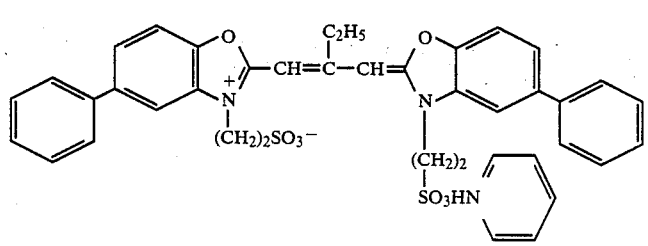
(Sen-7)

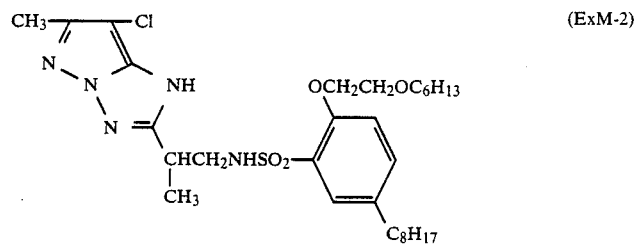
(ExM-2)

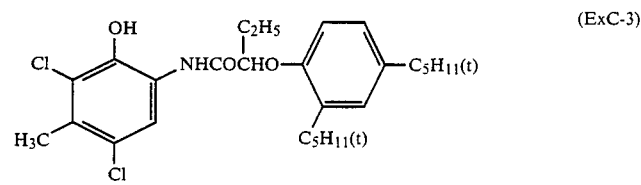
(ExC-3)

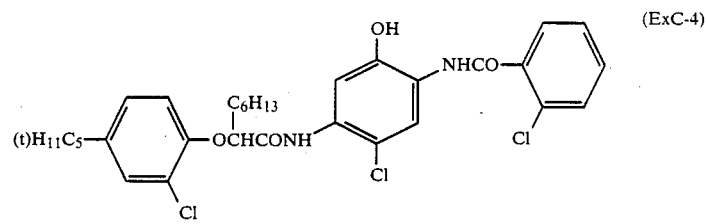
(ExC-4)

| | |
|---|---|
| Sixth layer (ultraviolet-absorbing layer) | |
| Gelatin | 0.53 |
| Ultraviolet absorber (UV-1/-2/-3; 1:4:4 molar ratio) | 0.21 |
| Solvent (Solv-6) | 0.08 |
| Hardener (H-1) | 0.01 |
| Seventh layer (protective layer) | |
| Gelatin | 1.33 |
| Acryl-modified polyvinyl alcohol copolymer (modification degree: 17%) | 0.17 |
| Liquid paraffin | 0.03 |

Details of the silver halide emulsions used in the above samples are shown in Table 5.

By adding dyes of the present invention and comparative dyes to the fourth layer given above, Samples (19) to (27) were prepared, and Sample (28) that did not contain such a dye was also prepared.

The amount of dye added was $2 \times 10^5 mol/m^2$ in each case.

TABLE 6

| Sample No. | Dye |
|---|---|
| 19 | dye 9 (of this invention) |
| 20 | dye 17 (of this invention) |
| 21 | dye 21 (of this invention) |
| 22 | dye 16 (of this invention) |

TABLE 6-continued

| Sample No. | Dye |
|---|---|
| 23 | dye 45 (of this invention) |
| 24 | dyes 9 and 16 (of this invention) |
| 25 | comparative dye E |
| 26 | comparative dye B |
| 27 | comparative dyes E and B |
| 28 | without dye |

An assessment was carried out as in Example 2, except using the following processing conditions, and the results are shown in Table 7.

| Processing steps | Temperature | Time |
|---|---|---|
| Color development | 35° C. | 45 sec |
| Bleach-fixing | 30 to 35° C. | 45 sec |
| Rising ① | 30 to 35° C. | 20 sec |
| Rising ② | 30 to 35° C. | 20 sec |
| Rising ③ | 30 to 35° C. | 20 sec |
| Rising ④ | 30 to 35° C. | 30 sec |
| Drying | 70 to 80° C. | 60 sec |

(a three-tank counter-current system from rinsing ④ to ① was used)

The compositions of the processing solutions used were as follows:

| Color developing solution | |
|---|---|
| Water | 800 ml |
| Ethylenediamine-N,N,N',N'-tetramethylenephosphonic acid | 1.5 g |
| Triethylenediamine(1,4-diazabicyclo(2,2,2)octane) | 5.0 g |
| Sodium chloride | 1.4 g |
| Potassium carbonate | 25 g |
| N-ethyl-N-(β-methanesulfonamidoethyl)-3-methyl-4-aminoaniline sulfate | 5.0 g |
| N,N-diethylhydroxylamine | 4.2 g |
| Brightening agent (UVITEX CK, manufactured by Ciba-Geigy) | 2.0 g |
| Water to make | 1000 ml |
| pH (25° C.) | 10.10 |
| Bleach-fixing solution | |
| Water | 400 ml |
| Ammonium thiosulfate (70%) | 100 ml |
| Sodium sulfite | 18 g |
| Ethylenediaminetetraacetic acid iron (III) ammonium | 55 g |
| Ethylenediaminetetraacetic acid disodium | 3 g |
| Ammonium bromide | 40 g |
| Glacial acetic acid | 8 g |
| Water to make | 1000 ml |
| pH (25° C.) | 5.5 |
| Rinsing solution | |
| Ion-exchanged water (the concentrations of both calcium and magnesium were 3 ppm or below) | |

TABLE 7

| Sample No. | Remaining ratio of dye | Fogging |
|---|---|---|
| 19 | 95% | 0.01 |
| 20 | 91% | 0.01 |
| 21 | 95% | 0.01 |
| 22 | 98% | 0.02 |
| 23 | 97% | 0.01 |
| 24 | 95%, 99% | 0.02 |
| 25 | 86% | 0.04 |
| 26 | 80% | 0.03 |
| 27 | 85%, 80% | 0.04 |
| 28 | — | 0.01 |

As is apparent from the results in Table 7, the samples that used the dyes of the present invention are excellent in stability in the film, and the fogging of the samples that used the dyes of the present invention is less.

EXAMPLE 4

A color photographic material was prepared by multi-coatings composed of the following for the first to fourteenth layers on one side, and for the fifteenth and sixteenth layers on the back side of a double-sided polyethylene-laminated paper substrate (of thickness 100 μm). Titanium dioxide, as a white pigment, and a small amount of ultramarine blue, as a bluish dye, were included in the polyethylene film of the first-layer side (the chromaticies of the substrate surface in L*, a*, and b* were 88.0, −0.20, and −0.75, respectively).

Composition of photosensitive layers

In the following compositions each ingredient is indicated in g/m$^2$ of coating amount, but the coating amount of silver halide is indicated in terms of silver. Emulsions for each layer were prepared in accordance with the preparation procedure of EM-10, providing that the emulsion of the 14th layer used a Lipman emulsion that was not chemically surface-ripened.

| First layer (Antihalation layer) | |
|---|---|
| Black colloidal silver | 0.10 |
| Gelatin | 0.70 |
| Second layer (Intermediate layer) | |
| Gelatin | 0.70 |
| Third layer (Low sensitivity red-sensitive emulsion layer) | |
| Silver bromide emulsion spectral-sensitized by red-sensitizing dyes (Sen-8, -9, and -10)(average grain size: 0.25 μm, grain size distribution (deviation coefficient): 8%, octahedral) | 0.04 |
| Silver chlorobromide emulsion spectral-sensitized by red-sensitizing dyes (Sen-8, -9, and -10)(silver chloride: 5 mol %, average grain size: 0.40 μm, grain size distribution: 10%, octahedral) | 0.08 |
| Gelatin | 1.00 |
| Cyan coupler (blend of ExC-2, -4, and -5 in a ratio 1:1:0.2) | 0.30 |
| Discoloration inhibitor (blend of Cpd-10, UV-1, -5, and -6 in equal ratio) | 0.18 |
| Stain inhibitor (Cpd-11) | 0.003 |
| Coupler dispersion medium (Cpd-12) | 0.03 |
| Coupler solvent (blend of Solv-2, -6, and -7 in equal ratio) | 0.12 |
| Fourth layer (High sensitivity red-sensitive emulsion layer) | |
| Silver bromide emulsion spectral-sensitized by red-sensitizing dyes (Sen-8, -9 and -10)(average grain size: 0.60 μm, grain size distribution: 15%, octahedral) | 0.14 |
| Gelatin | 1.00 |
| Cyan coupler (blend of ExC-2, -4, and -5 in a ratio 1:1:0.2) | 0.30 |
| Discoloration inhibitor (blend of Cpd-10, UV-1, -5, and -6 in equal ratio) | 0.18 |
| Coupler dispersion medium (Cpd-12) | 0.03 |
| Coupler solvent (blend of Solv-2, -6, and -7 in equal ratio) | 0.12 |
| Fifth layer (Intermediate layer) | |
| Gelatin | 1.00 |
| Color-mix inhibitor (Cpd-4) | 0.08 |
| Color-mix inhibitor solvent (blend of Solv-3 and -4 in equal ratio) | 0.16 |
| Polymer latex (Cpd-13) | 0.10 |
| Six layer (Low sensitivity green-sensitive emulsion layer) | |
| Silver bromide emulsion spectral-sensitized by green-sensitizing dye (Sen-7)(average grain size: 0.25 μm, grain size distribution: 8%, octahedral) | 0.04 |
| Silver chlorobromide emulsion spectral-sensitized by green-sensitizing dye (Sen-7)(silver chloride: 5 mol %, average grain size: 0.40 μm, grain size distribution: 10%, octahedral) | 0.06 |

| | |
|---|---|
| *-continued* | |
| Gelatin | 0.80 |
| Magenta coupler (blend of ExM-3, -4, and -5 in equal ratio) | 0.11 |
| Discoloration inhibitor (Cpd-6 and -24 in equal ratio) | 0.15 |
| Stain inhibitor (blend of Cpd-7, -8, -14, and -15 in a ratio 10:7:7:1) | 0.025 |
| Coupler dispersion medium (Cpd-12) | 0.05 |
| Coupler solvent (blend of Solv-3 and -5 in equal ratio) | 0.15 |
| Seventh layer (High sensitivity green-sensitive emulsion layer) | |
| Silver bromide emulsion spectral-sensitized by green-sensitizing dye (Sen-7)(average grain size: 0.65 μm, grain size distribution: 16%, octahedral) | 0.10 |
| Gelatin | 0.80 |
| Magenta coupler (blend of ExM-3, -4, and -5 in equal ratio) | 0.11 |
| Discoloration inhibitor (blend of Cpd-6 and -24 in equal ratio) | 0.15 |
| Stain inhibitor (blend of Cpd-7, -8, -14, and -15 in a ratio 10:7:7:1) | 0.025 |
| Coupler dispersion medium (Cpd-12) | 0.05 |
| Coupler solvent (blend of Solv-3 and -5 in equal ratio) | 0.15 |
| Eight layer (intermediate layer) | |
| Same as the fifth layer | |
| Ninth layer (Yellow filter layer) | |
| Yellow colloidal silver | 0.12 |
| Gelatin | 0.07 |
| Color-mix inhibitor (Cpd-4) | 0.03 |
| Color-mix inhibitor solvent (blend of Solv-3 and -4 in equal ratio) | 0.10 |
| Polymer latex (Cpd-13) | 0.07 |
| Tenth layer (intermediate layer) | |
| Same as the fifth layer | |
| Eleventh layer (Low sensitivity blue-sensitive emulsion layer) | |
| Silver bromide emulsion spectral-sensitized by blue-sensitizing dyes (Sen-11 and -12)(average grain size: 0.40 μm, grain size distribution: 8%, octahedral) | 0.07 |
| Silver bromide emulsion spectral-sensitized by blue-sensitizing dyes (Sen-11 and -12) (silver chloride: 8 mol %, average grain size: 0.60 μm, grain size distribution: 11%, octahedral) | 0.14 |
| Gelatin | 0.80 |
| Yellow coupler (Blend of ExY-1 and -2 in equal ratio) | 0.35 |
| Discoloration inhibitor (Cpd-2) | 0.10 |
| Stain inhibitor (blend of Cpd-11 and -16 in a ratio 1:5) | 0.007 |
| Coupler dispersion medium (Cpd-12) | 0.05 |
| Coupler solvent (Solv-12) | 0.10 |
| Twelfth layer (High sensitivity blue-sensitive emulsion layer) | |
| Silver bromide emulsion spectral-sensitized by blue-sensitizing dyes (Sen-11 and -12)(average grain size: 0.85 μm, grain size distribution: 18%, octahedral) | 0.15 |
| Gelatin | 0.60 |
| Yellow coupler (blend of ExY-1 and -2 in equal ratio) | 0.30 |
| Discoloration inhibitor (Cpd-2) | 0.10 |
| Stain inhibitor (blend of Cpd-11 and -16 in a ratio 1:5) | 0.007 |
| Coupler dispersion medium (Cpd-12) | 0.05 |
| Coupler solvent (Solv-12) | 0.10 |
| Thirteenth layer (Ultraviolet ray absorbing layer) | |
| Gelatin | 1.50 |
| Ultraviolet ray absorbent (blend of UV-1, -3, and -6 in equal ratio) | 0.50 |
| Color-mix inhibitor (blend of Cpd-4 and -17 in equal ratio) | 0.03 |
| Dispersion medium (Cpd-12) | 0.02 |
| Ultraviolet ray absorbent solvent (bend of solv-2 and -8 in equal ratio) | 0.08 |
| Irradiation-inhibiting dye (bend of Cpd-18, -19, -20, and -21 in a ratio 1:1:2:2) | 0.07 |
| Fourteenth layer (Protective layer) | |
| Fine grain silver chlorobromide emulsion (silver chloride: 97 mol %, average grain size: 0.1 μm) | 0.03 |
| Copolymer of acryl-modified poly(vinyl alcohol) | 0.01 |
| Poly(methyl methacrylate)particle (average particle size: 2.4 μm) and silicon dioxide (average particle size: 5 μm)(blend in equal ratio | 0.05 |
| Gelatin | 1.80 |
| Gelatin hardener (blend of H-1 and H-2 in equal ratio) | 0.18 |
| Fifteenth layer (Back-side layer) | |
| Gelatin | 2.50 |
| Ultraviolet ray absorbent (blend of UV-1, -6, and -3 in equal ratio) | 0.50 |
| Dye (blend of Cpd-18, -19, -20, and -21 in equal ratio) | 0.06 |
| Sixteenth layer (Back-side protective layer) | |
| Poly(methyl methacrylate) particle (average particle size: 2.4 μm) and silicon dioxide (average particle size: 5 μm)(blend in equal ratio | 0.05 |
| Gelatin | 2.00 |
| Gelatin hardener (blend of H-1 and -2 in equal ratio) | 0.14 |

Preparation of emulsion EM10

Aqueous solutions containing potassium bromide and silver nitrate were simultaneously added to an aqueous solution of gelatin with vigorous agitation at 75° C. over 15 minutes, to obtain a monodisperse silver bromide emulsion of octahedral crystals having an average grain size of 0.40 μm. A chemical-sensitizing treatment of the thus-obtained emulsion was carried out by adding, in order, 0.3 g/mol·Hg of 3,4-dimethyl-1,3-thiazoline-2-thion, 6 mg/mol·Hg of sodium thiosulfate, and 7 mg/mol·Hg of chloroauric acid (tetra-hydrate) and heating at 75° C. for 80 minutes. The thus-obtained silver bromide grains were brought up as a core in the same precipitating conditions as the first precipitating process, to obtain finally a monodisperse core-shell silver bromide emulsion of octahedral-shaped grains having an average grain size of 0.7 μm. The deviation coefficient of the grain size distribution of this emulsion was about 10%. A further chemical sensitization of this emulsion was carried out by adding 1.5 mg/mol·Hg of sodium thiosulfate and 1.5 mg/mol·Hg of chloroauric acid (tetrahydrate) and heating it at 60° C. for 60 minutes, to obtain an internal latent-image type silver halide emulsion.

In each layer, the compounds ExZK-1 and ExZK-2, in amounts of $10^{-3}$ and $10^{-2}$ weight % to the coating amount of silver halide, respectively, were included as nucleating agents, and $10^{-2}$ weight % of compound Cpd-22 was included as a nucleation accelerator. Further, Alkanol XC (trade name, made by Dupont) and sodium alkylbenzenesulfonate were used as auxiliary agents for the emulsification and dispersion, and succinate ester and Magefac F-120 (trade name, made by Dai Nippon Ink & Chemicals Inc.) were added as coating aids to each layer. In the layers containing silver halide emulsion or colloidal silver, compounds Cpd-1, -5, and -23 were used as stabilizers. The thus-prepared sample is referred to as Sample 29. Compounds used in the Example were as follows:

Sen-7 is the same as in Example 3.
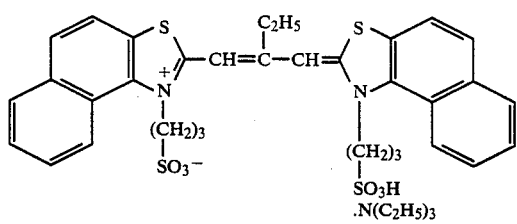
Sen-8
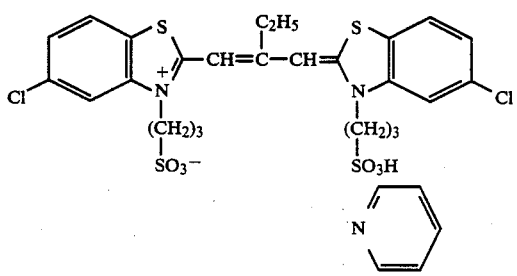
Sen-9
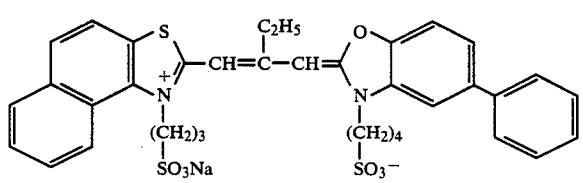
Sen-10
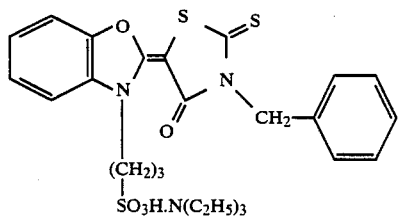
Sen-11
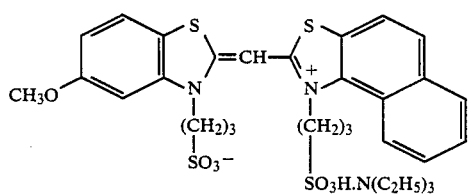
Sen-12
UV-1 and UV-3 are the same as in Example 2.
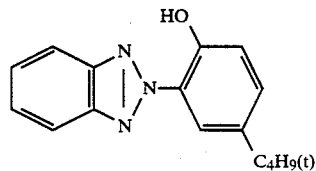
UV-5
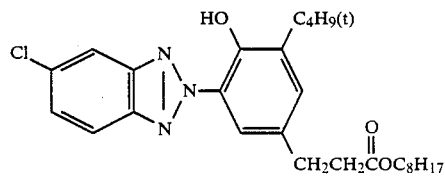
UV-6
Cpd-2, Cpd-4, Cpd-6, Cpd-7, and Cpd-8 are the same as in Example 2.

-continued
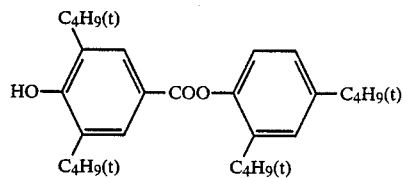 Cpd-10
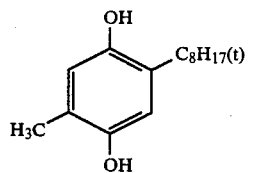 Cpd-11
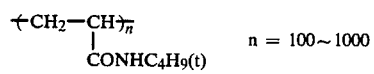 Cpd-12
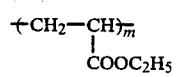 Cpd-13
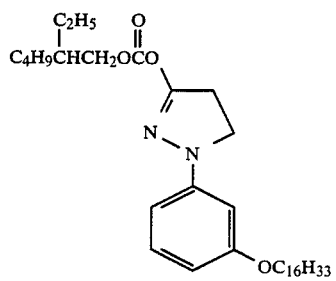 Cpd-14
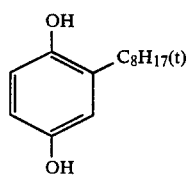 Cpd-15
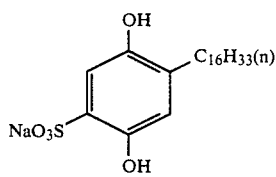 Cpd-16
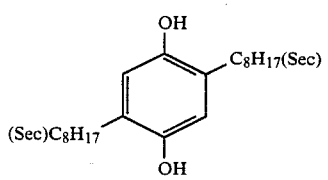 Cpd-17
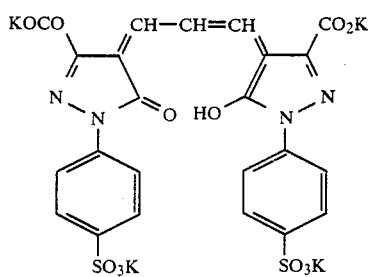 Cpd-18

-continued
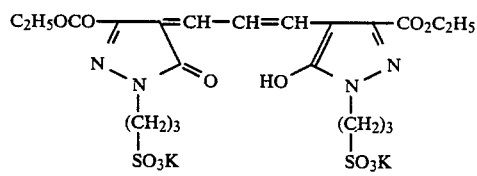
Cpd-19
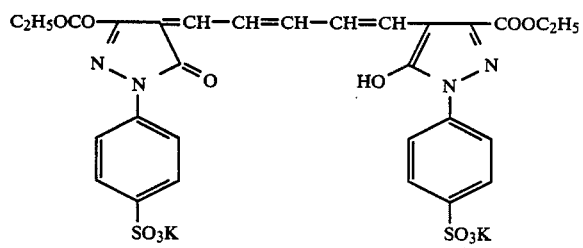
Cpd-20
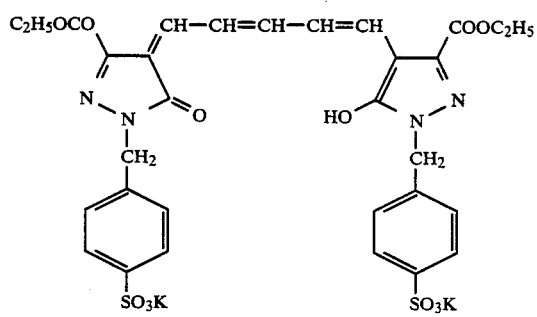
Cpd-21
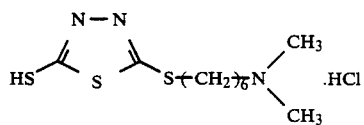
Cpd-22
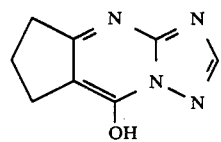
Cpd-23
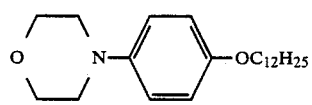
Cpd-24
ExC-2 is the same as in Example 2.
ExC-4 is the same as in Example 3.
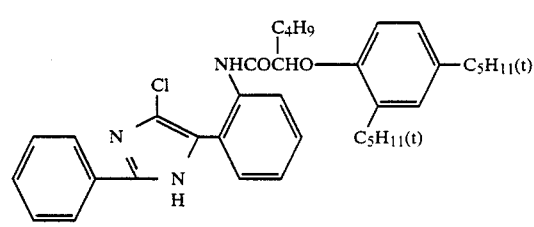
ExC-5

-continued

ExM-3
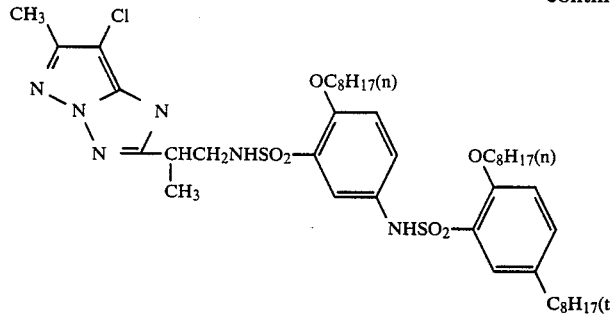

ExM-4
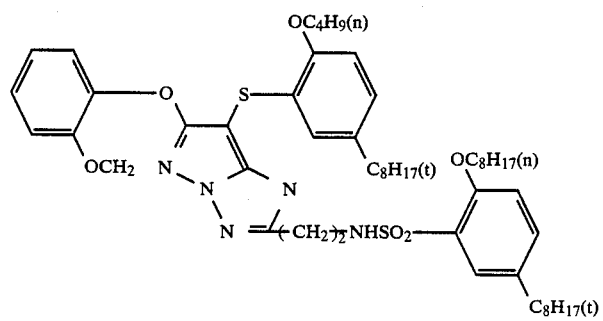

ExM-5
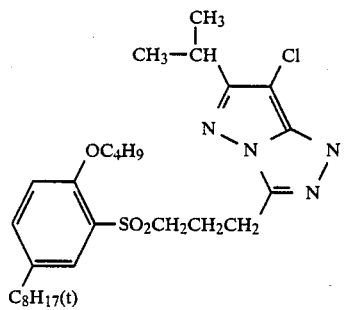

ExY-1 is the same as in Example 2.

ExY-2
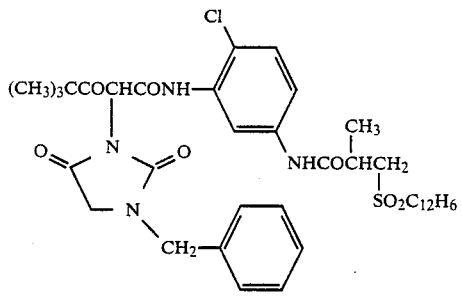

Solv-2, Solv-3, Solv-4, Solv-5, and Solv-6 are the same as in Example 2.
Di(3-methylhexyl)phthalate  Solv-7
Di(2-ethylhexyl)phthalate  Solv-8
H-1 is the same as in Example 2.
1,2-Bis(vinylsulfonylacetoamido)ethane  H-2
7-(3-Ethoxycarbonylaminobenzamido)-  ExZK-1
9-methyl-10-propargyl-1,2,3,4-tetrahydroacryginum trifluoromethanesulfonato
2-[4-{3-[3-{3-[5-{3-[2-Chloro-5-(1-  ExZK-2
dodecyloxycarbonylethoxycarbonyl)phenylcarbamoyl]-
4-hydroxy-1-naphthylthio tetrazole-1-il]phenyl}-
ureido]benzensulfonamido}phenyl]-1-formylhydrazine Samples 30 to 38 were prepared by repeating the preparation procedure of Sample 29, except that the compounds of the present invention or the comparative compounds were used in a combination or instead of the irradiation-inhibiting dye in the thirteenth layer. The compositions of the thirteenth layer of Samples 29 to 38 are shown in Table 8.

In order to manifest the effects of the present invention, the following experiments were carried out:

(1) Evaluation of color reproductivity

A Macbeth Color Checker was used to take a photograph using a negative color film (SHR-100, made by Fuji Photo Film Co., Ltd.), and it was printed on color paper (02 Ⓐ, made by Fuji Photo Film Co., Ltd.) to prepare a color original. Each color print of Samples 29 to 38 was prepared by printing the above-obtained color original using a reflection-type printer and by developing treatment according to the steps described below. These prints were prepared by adjusting the color density so that the gray of neutral 5 of the Macbeth Color Checker was gray density 1.0 on each print.

In order to evaluate the color reproduction of red, green, and blue of the thus-obtained color images, Munsell's chroma values were calculated from the measured values.

(2) Evaluation of image-stain

To evaluate the degree of image-stain of photographic material after processing due to the residual dye, Samples 29 to 58 were subjected to an exposure of light of 500 CMS at 3200K and a developing process. In this case a shorter processing time than the standard condition was used (color-developing time: 30 sec). The cyan density and magenta density of the thus-obtained samples were measured. The results are shown in Table 9.

(3) Evaluation of sharpness

C.T.F. (%) values of a space-frequency of 15 stripes/mm were measured. The results are shown in Table 9.

Samples were subjected to continuous processing using an automatic developing machine in the following processing steps using the following processing solutions, until the replenisher-amount of the developing solution equaled three-times the volume of the tank.

| Step | Processing steps Time (sec) | Temperature (°C.) | Mother solution tank (l) | Replenisher amount (ml/m$^2$) |
|---|---|---|---|---|
| Color-developing | 135 | 38 | 15 | 300 |
| Bleach-fixing | 40 | 33 | 3 | 300 |
| Water-washing (1) | 40 | 33 | 3 | — |
| Water-washing (2) | 40 | 33 | 3 | 320 |
| Drying | 30 | 80 | | |

The washing-water replenishing was carried out using the so-called counter-current replenishing mode. That is, washing water was fed to the tank of washing (2), from which the overflow water was fed to the tank of washing (1). In this case the carried-over amount of bleach-fixing solution by the photographic material was 35 ml/m$^2$, and the ratio of the washing-water replenishing amount to the carried-over amount of bleach-fixing solution was 9.1.

| Composition of processing solution | Mother solution | Replenisher |
|---|---|---|
| Color-developing solution | | |
| Ethylenediaminetetrakis-methylene phosphate | 1.5 g | 1.5 g |
| Ethylene glycol | 10 ml | 10 ml |
| Benzyl alcohol | 12.0 ml | 14.4 ml |
| Potassium bromide | 1.60 g | 1.0 g |
| Sodium sulfite | 2.4 g | 2.9 g |
| N,N-Bis(carboxymethyl)hydrazine | 4.0 g | 4.8 g |
| Triethanolamine | 6.0 g | 7.2 g |
| N-Ethyl-N-(β-methanesulfonamidoethyl)-3-methyl-4-aminoaniline phosphate | 6.0 g | 7.2 g |
| Potassium carbonate | 30.0 g | 25.0 g |
| Fluorescent whitening agent (diaminostilbene series) | 1.0 g | 1.2 g |
| Water to make | 1000 ml | 1000 ml |
| pH (25° C.) | 10.50 | 11.00 |
| Bleach-fixing solution | | |
| (Both mother solution and replenisher are the same) | | |
| Disodium ethylenediaminetetraacetate dihydrate | 4.0 g | |
| Fe(III) ammonium ethylenediaminetetraacetate dihydrate | 70.0 g | |
| Ammonium thiosulfate (700 g/l) | 150 ml | |
| Sodium p-toluenesulfinate | 20.0 g | |
| 2-Amino-5-mercapto-1,3,4-thiadiazole | 0.6 g | |
| Ammonium nitrate | 10.0 g | |
| Water to make | 1000 ml | |
| pH (25° C.) | 6.20 | |

Washing water (Both mother solution and replenisher are the same)

Tap water was treated by passage through a hybrid-type column filled with an H-type strong acidic cation-exchange resin (Amberlite IR-120B, made by Rohm & Haas) and an OH-type strong alkaline anion-exchange resin (Amberlite IR-400, made by Rohm & Haas) to obtain water containing 3 mg/l or less of both calcium and magnesium ions. To the thus-treated water, 20 mg/l of sodium dichloroisocyanurate and 1.5 g/l of sodium sulfate were added. The pH of the water was in the range of 6.5 to 7.5.

TABLE 8

| Sample | | Irradiation-inhibiting Dye in the Thirteenth Layer ($\times 10^{-5}$ mol/m$^2$) |
|---|---|---|
| 29 | Comparative Example | Cpd-18: 1.5, Cpd-19: 1.5 Cpd-20: 3.0, Cpd-21: 3.0 |
| 30 | Comparative Example | Comparative Dye D: 8.0 |
| 31 | Comparative Example | Cpd-18: 0.7, Cpd-19: 0.7 Cpd-20: 1.5, Cpd-21: 1.5 Comparative Dye D: 4.0 |
| 32 | Comparative Example | Cpd-19: 1.5, Cpd-21: 3.0 Comparative Dye E: 4.0 |
| 33 | This Invention | Dye 12 of this invention: 8.0 |
| 34 | " | Dye 52 of this invention: 20.0 |
| 35 | " | Dye 14 of this invention: 8.0 |
| 36 | " | Dye 12 of this invention: 4.0 Dye 14 of this invention: 4.0 |
| 37 | " | Cpd-18: 0.7, Cpd-19: 0.7 Cpd-20: 1.5, Cpd-21: 1.5 Dye 12 of this invention: 4.0 |
| 38 | " | Cpd-19: 1.5, Cpd-21: 1.5 Dye 14 of this invention: 4.0 |

Comparative Dye D

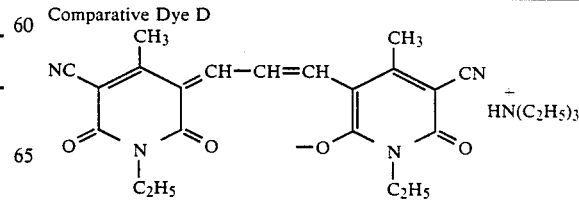

Comparative Dye E

TABLE 8-continued

| | Irradiation-inhibiting Dye in the Thirteenth Layer |
|---|---|
| Sample | ($\times 10^{-5}$ mol/m$^2$) |

[Chemical structures shown: two pyrazolone dyes connected by a pentamethine chain, each with N-phenyl-SO$_3$K substituents, one with CH$_3$ and C=O, the other with CH$_3$ and HO groups]

TABLE 9

| | Color Reproductivity (Chroma Value) | | Stain after Processing | | Sharpness | |
|---|---|---|---|---|---|---|
| Sample | Red | Green | C-Density | M-density | M | C |
| 29 | 9.0 | 8.8 | 0.16 | 0.16 | 31.0 | 31.2 |
| 30 | 10.5 | 9.2 | 0.15 | 0.16 | 32.1 | 31.4 |
| 31 | 9.9 | 9.0 | 0.16 | 0.16 | 32.8 | 31.8 |
| 32 | 9.7 | 9.0 | 0.16 | 0.15 | 32.8 | 31.8 |
| 33 | 10.8 | 9.5 | 0.13 | 0.13 | 33.0 | 32.3 |
| 34 | 10.9 | 9.8 | 0.13 | 0.13 | 34.8 | 36.2 |
| 35 | 10.9 | 9.8 | 0.14 | 0.14 | 33.2 | 33.5 |
| 36 | 10.7 | 9.7 | 0.13 | 0.13 | 32.9 | 33.0 |
| 37 | 10.0 | 9.4 | 0.14 | 0.14 | 33.1 | 33.8 |
| 38 | 10.1 | 9.4 | 0.13 | 0.13 | 33.0 | 33.8 |

As is apparent from the results in Table 9, by using the dyes of the present invention the chroma values of red and green become large, and their color reproductivities are improved. Further, it can be seen that the samples that used the dyes of the present invention are superior in reproductivity of white ground, with remarkably less stain of image and sharpness.

EXAMPLE 5

A color photographic material was prepared by multi-coatings composed of the following for the first to the twelfth layers on a double-sided polyethylene-laminated paper substrate. Titanium dioxide, as a white pigment, and a small amount of ultramarine, as a bluish dye, were added in the polyethylene film of the first-layer side.

Composition of photosensitive layers

In the following compositions each ingredient is indicated in g/m$^2$ of a coating amount, but the coating amount of the silver halide is indicated in terms of silver.

| First layer (Gelatin layer) | |
|---|---|
| Gelatin | 1.30 |
| Second layer (Antihalation layer) | |
| Black colloidal silver | 0.10 |
| Gelatin | 0.70 |
| Third layer (Low sensitivity red-sensitive emulsion layer) | |
| Silver iodobromide emulsion spectral-sensitized by red-sensitizing dye (Sen-8 and -13)(silver iodide: 5.0 mol %, average grain size: 0.4 μm) | 0.15 |
| Gelatin | 1.00 |
| Cyan coupler (ExC-2) | 0.14 |
| Cyan coupler (ExC-4) | 0.10 |
| Discoloration inhibitor (UV-1, -3 and -5) | 0.06 |
| Coupler solvent (Solv-2 and -8) | |
| Fourth layer (High sensitivity red-sensitive emulsion layer) | |
| Silver iodobromide emulsion spectral-sensitized by red-sensitizing dye (Sen-8 and -13)(silver iodide: 6.0 mol %, average grain size: 0.7 μm) | 0.15 |
| Gelatin | 1.00 |
| Cyan coupler (ExC-2) | 0.20 |
| Cyan coupler (ExC-4) | 0.10 |
| Discoloration inhibitor (UV-1, -3 and -5) | 0.15 |
| Coupler solvent (Solv-2 and -8) | 0.10 |
| Fifth layer (Intermediate layer) | |
| Black colloidal silver | 0.02 |
| Gelatin | 1.00 |
| Color-mix inhibitor (Cpd-4) | 0.08 |
| Color-mix inhibitor solvent (Solv-3 and -4) | 0.16 |
| Polymer latex (Cpd-13) | 0.10 |
| Sixth layer (Low sensitivity green-sensitive emulsion layer) | |
| Silver iodobromide emulsion spectral-sensitized by green-sensitizing dye (Sen-14)(Silver iodide: 2.5 mol %, average grain size: 0.4 μm) | 0.10 |
| Gelatin | 0.80 |
| Magenta coupler (ExM-3) | 0.10 |
| Discoloration inhibitor (Cpd-6) | 0.10 |
| Stain inhibitor (Cpd-14) | 0.01 |
| Stain inhibitor (Cpd-11) | 0.001 |
| Coupler solvent (Solv-3 and -5) | 0.15 |
| Seventh layer (High sensitivity green-sensitive emulsion layer) | |
| Silver iodobromide emulsion spectral-sensitized by green-sensitizing dye (Sen-14)(Silver iodide: 3.5 mol %, average grain size: 0.9 μm) | 0.10 |
| Gelatin | 0.80 |
| Magenta coupler (ExM-3) | 0.10 |
| Discoloration inhibitor (Cpd-6) | 0.10 |
| Stain inhibitor (Cpd-14) | 0.01 |
| Stain inhibitor (Cpd-11) | 0.001 |
| Coupler solvent (Solv-3 and -5) | 0.15 |
| Eighth layer (Yellow filter layer) | |
| Yellow colloidal silver | 0.20 |
| Gelatin | 1.00 |
| Color-mix inhibitor (Cpd-4) | 0.06 |
| Color-mix inhibitor solvent (Solv-3 and -4) | 0.15 |
| Polymer latex (Cpd-13) | 0.10 |
| Ninth layer (Low sensitivity blue-sensitive emulsion layer) | |
| Silver iodobromide emulsion spectral-sensitized by blue-sensitizing dye (Sen-11)(silver iodide: 2.5 mol %, average grain size: 0.5 μm) | 0.15 |
| Gelatin | 0.50 |
| Yellow coupler (ExY-1) | 0.20 |
| Stain inhibitor (Cpd-11) | 0.001 |
| Coupler solvent (Solv-2) | 0.05 |
| Tenth layer (High sensitivity blue-sensitive emulsion layer) | |
| Silver iodobromide emulsion spectral-sensitized by blue-sensitizing dye (Sen-11)(silver iodide: 2.5 mol %, average grain size: 1.2 μm) | 0.25 |
| Gelatin | 1.00 |
| Yellow coupler (ExY-1) | 0.40 |
| Stain inhibitor (Cpd-11) | 0.002 |
| Coupler solvent (Solv-2) | 0.10 |
| Eleventh layer (Ultraviolet ray absorbing layer) | |
| Gelatin | 1.50 |
| Ultraviolet ray absorbent (UV-1, -5 and -7) | 1.00 |
| Color-mix inhibitor (Cpd-17) | 0.06 |
| Color-mix inhibitor solvent (Solv-2) | 0.15 |
| Irradiation inhibiting dye (Cpd-25) | 0.02 |
| Irradiation inhibiting dye (Cpd-20) | 0.02 |
| Twelfth layer (Protective layer) | |
| Fine grain silver chlorobromide emulsion (silver chloride: 97 mol %, average grain size: 0.2 μm) | 0.07 |
| Gelatin | 1.50 |
| Gelatin hardener (H-2) | 0.17 |

In the above-described compositions the same materials as in Example 4 are shown by the same symbol as in Example 4. Materials used of the other symbols are shown below.

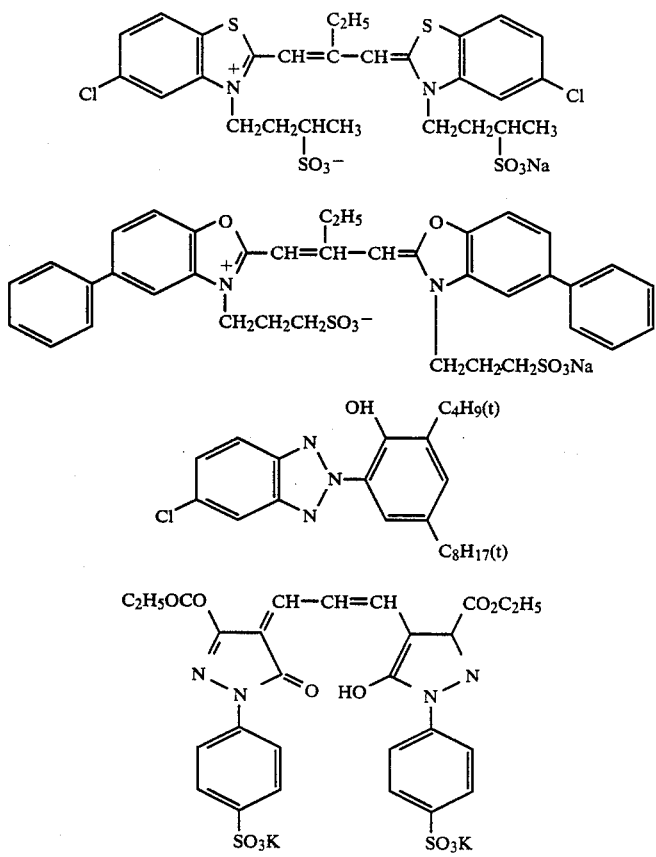

Sen-13

Sen-14

UV-7

Cpd-25

The thus-prepared sample is referred to as Sample 39.

Next, Samples 40 to 44 were prepared by repeating the preparation procedure of Sample 39, except that the dyes of the present invention or the comparative dyes were used in combination with or instead of the irradiation-inhibiting dyes in the eleventh layer. The dyes used and their amount are shown in Table 8.

The tests described below were carried out for each of Samples 39 to 44.

(Evaluation of color reproductivity)

A macbeth Color Checker was used to take a photograph using a coupler-in-emulsion type reversal film RDP (made by Fuji Photo Film Co., Ltd.). The color positive film obtained by CP-56P processing of the above reversal film was used as a color positive original to prepare color prints of each color-reversal paper of Samples 39 to 44 by a substractive color process.

These prints were prepared by adjusting the color density using Y-, M-, and C-filters so that the gray of neutral 5 of the Macbeth Color Checker was density 1.0 of the gray on each print. The developing process was carried out according to the process described below. In order to evaluate the color reproduction of red, green, and blue of the thus-obtained color images, Munsell's chroma values were calculated from the measured values.

(Evaluation of the image-stain after processing)

Additionally, in order to evaluate the degree of image-stain of each sample, Samples 39 to 44 were subjected to an exposure of light at 500 CMS using a sensitometer of color temperature 3200K through non-colored glass, followed by the same developing process. The cyan densities of the thus-obtained samples were measured using a Macbeth densitometer.

(Evaluation of sharpness)

The sharpness of Samples 39 to 44 were measured as in Example 4.

The developing process was carried out according to the processing steps described below. The results obtained are shown in Table 11.

| processing process | | |
|---|---|---|
| First developing (Black & white developing) | 38° C. | 1 min 15 sec |
| Water washing | 38° C. | 1 min 30 sec |
| Reversal exposure | over 100 Lux | over 1 sec |
| Color developing | 38° C. | 2 min 15 sec |
| Water washing | 38° C. | 45 sec |
| Bleach-fixing | 38° C. | 2 min 00 sec |
| Water washing | 38° C. | 2 min 15 sec |
| Composition of the processing solution | | |
| First developing solution | | |
| Pentasodium nitrilo-N,N,N-trimethylene-phosphonate | | 0.6 g |
| Pentasodium diethylenetriaminepentaacetate | | 4.0 g |
| Potassium sulfite | | 30.0 g |
| Potassium thiocyanate | | 1.2 g |
| Potassium carbonate | | 35.0 g |
| Potassium hydroquinonemonosulfonate | | 25.0 g |
| Diethylene glycol | | 15.0 ml |
| 1-phenyl-4-hydroxymethyl-4-methyl-3-pyrazolidone | | 2.0 g |
| Potassium bromide | | 0.5 g |
| Potassium iodide | | 5.0 mg |

-continued

| Water to make | 1 l |
| --- | --- |
| | (pH: 9.70) |
| Color-developing solution | |
| Benzyl alcohol | 15.0 ml |
| Diethylene glycol | 12.0 ml |
| 3,6-Dithia-1,8-octanediol | 0.2 g |
| Pentasodium nitrilo-N,N,N-trimethylene-phosphonate | 0.5 g |
| Pentasodium diethylenetriaminepentaacetate | 2.0 g |
| Sodium sulfite | 2.0 g |
| Potassium carbonate | 25.0 g |
| Hydroxylamine sulfonate | 3.0 g |
| N-Ethyl-N-(B-methanesulfonamidoethyl)-3-methyl-4-aminoaniline sulfonate | 5.0 g |
| Potassium bromide | 0.5 g |
| Potassium iodide | 1 l |
| Water to make | (pH: 10.40) |
| Bleach-fixing solution | |
| 2-Mercapto-1,3,4-trazole | 1.0 g |
| Disodium ethylenediaminetetraacetate dihydrate | 5.0 g |
| Ammonium iron (III) ethylenediaminetetraacetate monohydrate | 80.0 g |
| Sodium thiosulfate (700 g/l solution) | 160.0 ml |
| Glacial acetic acid | 5.0 ml |
| Water to make | 1 l |
| | (pH: 6.50) |

TABLE 10

| Sample | | Irradiation-inhibiting Dye in the Eleventh Layer (× 10$^{-5}$ mol/m$^2$) |
| --- | --- | --- |
| 39 | Comparative Example | Cpd-24: 2.8<br>Cpd-25: 2.6 |
| 40 | Comparative Example | Comparative Dye D: 8.0 |
| 41 | Comparative Example | Cpd-25: 2.4<br>Comparative Dye E: 4.0 |
| 42 | This Invention | Cpd-25: 2.4<br>Dye 12 of this invention: 4.0 |
| 43 | " | Dye 12 of this invention: 8.0 |
| 44 | " | Dye 14 of this invention: 8.0 |

TABLE 11

| | Color Reproductivity (Chroma Value) | | Stain after Processing | | Sharpness | |
| --- | --- | --- | --- | --- | --- | --- |
| Sample | Red | Green | C-Density | M-density | M | C |
| 39 | 9.7 | 8.8 | 0.16 | 0.15 | 31.8 | 31.5 |
| 40 | 10.3 | 9.4 | 0.15 | 0.16 | 33.2 | 32.0 |
| 41 | 10.0 | 9.0 | 0.15 | 0.16 | 33.5 | 33.0 |
| 42 | 10.3 | 9.5 | 0.13 | 0.13 | 33.2 | 32.5 |
| 43 | 10.6 | 9.7 | 0.13 | 0.13 | 34.0 | 33.0 |
| 44 | 10.4 | 9.5 | 0.12 | 0.12 | 34.2 | 33.0 |

As is apparent from the results in Table 11, Samples 42 to 44 according to the present invention are improved as compared with the Comparative Example such that the color reproductivities of red and green does not raise up, the color-stain are little and sharpness after processing are excellent. To the contrary, although Samples 40 to 41 are similarly improved, they are not preferably because greater color-stain appeared after processing, with contamination of the white background.

EXAMPLE 6

Samples 45 to 50 were prepared by repeating the preparation procedure of Sample 39 in Example 5, except that the supplementary dye in the eleventh layer and the sensitizing dyes in the red-sensitive emulsion layers (the third and fourth layers) were changed as shown in Table 12.

In these cases, the sensitizing dye used in the red-sensitive emulsion layers 8 the third and fourth layers) of Samples 48 to 50 was compound S-1, described below, instead of Sen-8 and -13.

As in Example 5, in the eleventh layer of Samples 46, 47, 49, and 50, in addition to two dyes, the dyes according to the present invention were supplementarily added to determine their effects. In the preparation of Samples 48 and 52, the dye A-3 (described in British Patent No. 1,521,083) was used.

The measurement results are shown in Table 12.

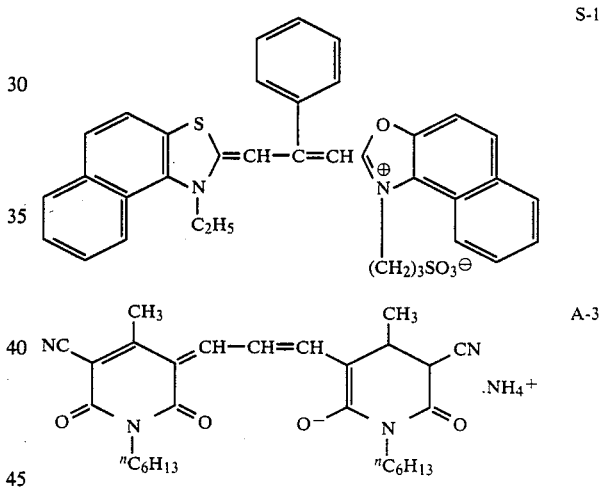

TABLE 12

| | | | Spectral-sensitivity of Red-sensitive Emulsion Layer | | Spectral-sensitivity of Green-sensitive Emulsion Layer | | | |
| --- | --- | --- | --- | --- | --- | --- | --- | --- |
| Sample | Supple-mentary Dye | Sensitizing Dye used in Red-sensitive Emulsion Layer | Wavelength at max. Sensitivity (nm) | Wavelength corresponding to 30% Sensitivity of max. Density (short wave-length side) (nm) | Wavelength at max. Sensitivity (nm) | Wavelength corresponding to 30% Sensitivity of max Density (long wave-length side) (nm) | Color Reproductivity | |
| | | | | | | | Red | Green |
| 45 | None | Sen-8 & -13 | 660 | 558 | 560 | 595 | 9.8 | 8.4 |
| 46 | 14 | " | 663 | 610 | 555 | 580 | 10.9 | 9.4 |
| 47 | 52 | " | 660 | 610 | 550 | 575 | 10.9 | 9.6 |
| 48 | None | S-1 | 575 | 550 | 560 | 595 | 7.0 | 6.8 |
| 49 | 14 | " | 625 | 575 | 554 | 581 | 9.5 | 8.0 |
| 50 | 52 | " | 625 | 580 | 550 | 585 | 9.9 | 8.8 |

As is apparent from the results in Table 12, the color reproductivity is improved according to the present invention.

Having described our invention as related to the embodiment, it is our intention that the invention be not limited by any of the details of the description, unless otherwise specified, but rather be construed broadly

What we claim is:

1. A silver halide photographic material comprising at least one of the dyes represented by the following formula (I):

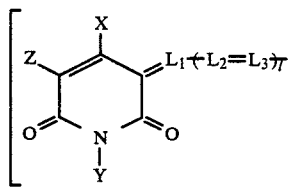

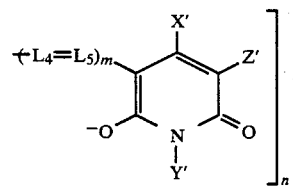

wherein X and X' each represent a hydrogen atom, a hydroxyl group, a carboxyl group, $-COOR_1$, $-COR_1$, $-CONH_2$, $-CONR_1R_2$, an alkyl group, an aralkyl group, a cycloalkyl group, an aryl group, or an amino group; Y and Y' each represent a hydrogen atom, an alkyl group, an aralkyl group, a cycloalkyl group, an aryl group, or an amino group; Z and Z' each represent a hydrogen atom, a cyano group, a carboxyl group, a sulfo group, an amino group,

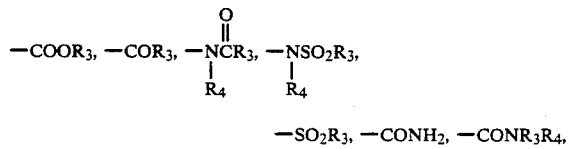

an alkyl group, an aralkyl group, a cycloalkyl group, or an aryl group; $R_1$ and $R_3$ each represent an alkyl group, an aralkyl group, a cycloalkyl group, or an aryl group; $R_2$ and $R_4$ each represent a hydrogen atom, an alkyl group, an aralkyl group, a cycloalkyl group, or an aryl group; $L_1$, $L_2$, $L_3$, $L_4$, and $L_5$ each represent a methine group; l and m each are 0 or 1; n is 1, 2, or 3; and $M^{n+}$ represents an n-valent cation, provided that at least one of X, X', Y, Y', Z, and Z' represents a group including a hydroxy group, a carboxyl group, or a sulfo group.

2. The silver halide photographic material as claimed in claim 1, wherein the silver halide grains are composed of silver chlorobromide containing 90 mol % or over of silver chloride.

3. The silver halide photographic material as claimed in claim 1, wherein the silver halide photographic material is a positive-positive type silver halide color photographic material.

4. The silver halide photographic material as claimed in claim 3, wherein
   (i) the wavelength exhibiting the maximum sensitivity of the spectral sensitivity of the red-sensitive emulsion layer is on the side where the wavelength is longer than 580 nm, and of the wavelengths corresponding a the sensitivity of 30% of the maximum sensitivity of its spectral sensitivity, the wavelength on the shortest wavelength side is on the side where the wavelength is longer than 560 nm, and
   (ii) the wavelength exhibiting the maximum sensitivity of the spectral sensitivity of the green-sensitive emulsion layer is on the side where the wavelength is shorter than 580 nm, and of the wavelengths corresponding to the sensitivity of 30% of the maximum sensitivity of its spectral sensitivity, the wavelength on the longest wavelength side is on the side where the wavelength is shorter than 590 nm.

5. The silver halide photographic material as claimed in claim 1, wherein the optical density of dye represented by formula (I) is in the range of 0.05 to 3.0.

6. The silver halide photographic material as claimed in claim 1, wherein the dye represented by formula (I) is dissolved into a hydrophilic colloid layer of the photographic material.

7. The silver halide photographic material as claimed in claim 1, wherein the dye represented by formula (I) is dispersed in a fine solid state into a hydrophilic colloid layer of the photographic material.

8. The silver halide photographic material as claimed in claim 1, wherein the dye represented by formula (I) is used with a hydrophilic polymer having a charge opposite the dye ion as a mordant in a layer.

9. The silver halide photographic material as claimed in claim 1, wherein the dye represented by formula (I) is dissolved using a surface-active agent.

10. The silver halide photographic material as claimed in claim 2, wherein the silver chloride content of the silver halide grains is 95 mol % or over.

11. The silver halide photographic material as claimed in claim 1, wherein the photographic material is a color print photographic material.

12. The silver halide photographic material as claimed in claim 1, wherein the positive-positive type silver halide color photographic material comprises a dye represented by the following formula (I) and at least one sensitizing dye represented by the following formula (IV) to sensitize a red-sensitive silver halide emulsion layer:

Formula (I)

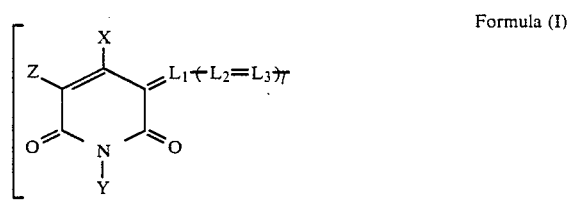

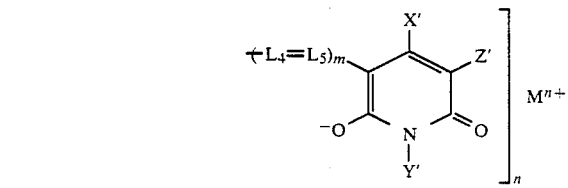

wherein X and X' each represent a hydrogen atom, a hydroxyl group, a carboxyl group, $-COOR_1$, $-COR_1$, $-CONH_2$, $-CONR_1R_2$, an alkyl group, an aralkyl group, a cycloalkyl group, an aryl group, or an amino group; Y and Y' each represent a hydrogen atom, an alkyl group, an aralkyl group, a cycloalkyl group, an aryl group, or an amino group; Z and Z' each represent a hydrogen atom, a cyano group, a carboxyl group, a sulfo group, an amino group,

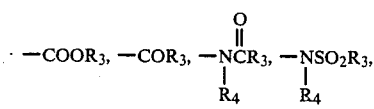

$-SO_2R_3$, $-CONH_2$, $-CONR_3R_4$, an alkyl group, an aralkyl group, a cycloalkyl group, or an aryl group; $R_1$ and $R_3$ each represent an alkyl group, an aralkyl group, a cycloalkyl group, or an aryl group; $R_2$ and $R_4$ each represent a hydrogen atom, an alkyl group, an aralkyl group, a cycloalkyl group, or an aryl group; $L_1$, $L_2$, $L_3$, $L_4$, and $L_5$ each represent a methine group; l and m each are 0 or 1; n is 1, 2, or 3; and $M^{n+}$ represents an n-valent cation, provided that at least one of X, X', Y, Y', Z, and Z' represents a group including a hydroxy group, a carboxyl group, or a sulfo group; and Formula (IV)

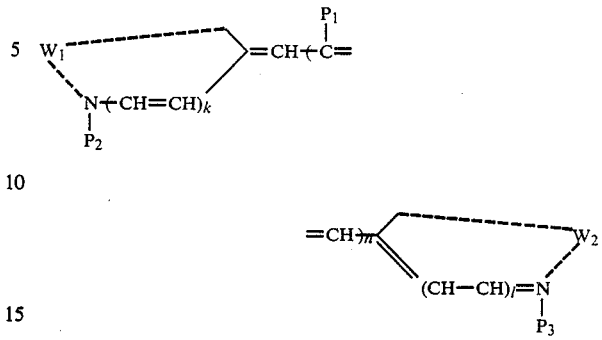

wherein $W_1$ and $W_2$ each represent a group of non-metallic atoms required to form a 5- or 6-membered heterocyclic ring to which a benzene ring or a naphthalene ring is condensed; $P_1$ represents a hydrogen atom, a substituted or unsubstituted alkyl group, an aralkyl group, or a substituted or unsubstituted aryl group; $P_2$ and $P_3$ each represent an alkyl group, a sulfo group, a hydroxy group, a carboxy group, a sulfophenyl group, a carboxyphenyl group, an alkoxy group, a phenyl group, or an alkyl group substituted with a halogen atom, at least one of $P_2$ and $P_3$ represents a group having a hydroxy group, a sulfo group, or a carboxy group; n is 0, 1, or 2; and k and l are 0 or 1, provided that $n+k+l\neq 0$.

* * * * *